United States Patent
Tamori et al.

(10) Patent No.: US 12,072,196 B2
(45) Date of Patent: Aug. 27, 2024

(54) MOBILE-OBJECT CONTROL DEVICE, MOBILE-OBJECT CONTROL METHOD, MOBILE OBJECT, INFORMATION PROCESSING APPARATUS, INFORMATION PROCESSING METHOD, AND PROGRAM

(71) Applicant: Sony Group Corporation, Tokyo (JP)

(72) Inventors: Masahiro Tamori, Tokyo (JP); Yasufumi Ogawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 214 days.

(21) Appl. No.: 17/297,462

(22) PCT Filed: Dec. 6, 2019

(86) PCT No.: PCT/JP2019/047765
§ 371 (c)(1),
(2) Date: May 27, 2021

(87) PCT Pub. No.: WO2020/129689
PCT Pub. Date: Jun. 25, 2020

(65) Prior Publication Data
US 2021/0396532 A1    Dec. 23, 2021

(30) Foreign Application Priority Data
Dec. 20, 2018    (JP) ................. 2018-237947

(51) Int. Cl.
*G01C 21/00* (2006.01)
*G01C 21/34* (2006.01)
*G05D 1/00* (2006.01)

(52) U.S. Cl.
CPC ..... *G01C 21/3453* (2013.01); *G01C 21/3438* (2013.01); *G05D 1/0225* (2013.01); *G05D 1/0276* (2013.01)

(58) Field of Classification Search
CPC ............ G01C 21/3453; G01C 21/3438; G01C 21/3407; G01C 21/3697; G05D 1/0225;
(Continued)

(56) References Cited

U.S. PATENT DOCUMENTS

| 10,303,171 B1* | 5/2019 | Brady ................. G05D 1/0278 |
| 2015/0338852 A1* | 11/2015 | Ramanujam ........... G08G 1/202 701/2 |

(Continued)

FOREIGN PATENT DOCUMENTS

| CN | 108216243 A | 6/2018 |
| CN | 108698611 A | 10/2018 |

(Continued)

OTHER PUBLICATIONS

International Search Report and Written Opinion mailed on Mar. 10, 2020, received for PCT Application PCT/JP2019/047765, Filed on Dec. 6, 2019, 9 pages including English Translation.

*Primary Examiner* — Khoi H Tran
*Assistant Examiner* — Tien Minh Le
(74) *Attorney, Agent, or Firm* — XSENSUS LLP

(57) ABSTRACT

A mobile-object control device includes: an operation control unit configured to control an operation of a mobile object to cause the mobile object to be present at a set place at a set time; and a notification control unit configured to control notification in a case where at least one of the set time or the set place cannot be achieved. The mobile object includes: a drive unit; an operation control unit configured to control the drive unit to cause the mobile object to be present at a set place at a set time; and a notification control unit configured to control notification in a case where at least one of the set time or the set place cannot be achieved. The present technology can be applied to, for example, a vehicle that performs automatic driving.

20 Claims, 12 Drawing Sheets

(58) Field of Classification Search
CPC ............ G05D 1/0276; B60W 60/0011; B60W 60/00253; B60W 50/14; G08G 1/202; G06Q 50/30

See application file for complete search history.

(56) References Cited

U.S. PATENT DOCUMENTS

| | | | |
|---|---|---|---|
| 2018/0074510 A1 | 3/2018 | Isaji | |
| 2018/0321050 A1* | 11/2018 | Chase | .................... G06Q 10/02 |
| 2021/0366286 A1* | 11/2021 | Kajiwara | ............... G08G 1/202 |

FOREIGN PATENT DOCUMENTS

| | | | |
|---|---|---|---|
| CN | 108883774 A | 11/2018 |
| EP | 3355242 A1 | 8/2018 |
| JP | 2017-76266 A | 4/2017 |
| JP | 2017-191371 A | 10/2017 |
| JP | 2018-122650 A | 8/2018 |
| WO | 2017/205961 A1 | 12/2017 |

* cited by examiner

MOBILE-OBJECT CONTROL DEVICE, MOBILE-OBJECT CONTROL METHOD, MOBILE OBJECT, INFORMATION PROCESSING APPARATUS, INFORMATION PROCESSING METHOD, AND PROGRAM

TECHNICAL FIELD

The present technology relates to a mobile-object control device, a mobile-object control method, a mobile object, an information processing apparatus, an information processing method, and a program, and particularly relates to a mobile-object control device, a mobile-object control method, a mobile object, an information processing apparatus, an information processing method, and a program suitable for using in a case of calling a vehicle for automatic driving.

BACKGROUND ART

Conventionally, there has been proposed a driving support device that enables safety confirmation in a parking space in a case where unmanned automatic parking-space exit is performed without a driver getting on a vehicle (see, for example, Patent Document 1).

CITATION LIST

Patent Document

Patent Document 1: Japanese Patent Application Laid-Open No. 2017-76266

SUMMARY OF THE INVENTION

Problems to be Solved by the Invention

However, Patent Document 1 does not consider a case of calling an automatic driving vehicle to outside.

The present technology has been made in view of such a situation, and is intended to allow a user to reliably call and board a mobile object such as a vehicle.

Solutions to Problems

A mobile-object control device of a first aspect of the present technology includes: an operation control unit configured to control an operation of a mobile object to cause the mobile object to be present at a set place at a set time; and a notification control unit configured to control notification in a case where at least one of the set time or the set place cannot be achieved.

A mobile-object control method of a first aspect of the present technology includes: controlling an operation of a mobile object to cause the mobile object to be present at a set place at a set time; and controlling notification in a case where at least one of the set time or the set place cannot be achieved.

A program of the first aspect of the present technology causes a computer to execute processing including: controlling an operation of a mobile object to cause the mobile object to be present at a set place at a set time; and controlling notification in a case where at least one of the set time or the set place cannot be achieved.

A mobile object of a second aspect of the present technology includes: a drive unit; an operation control unit configured to control the drive unit to cause the mobile object to be present at a set place at a set time; and a notification control unit configured to control notification in a case where at least one of the set time or the set place cannot be achieved.

An information processing apparatus of a third aspect of the present technology includes: a setting unit configured to set a set time and a set place; and a mobile-object control unit configured to instruct a mobile object to be present at the set place at the set time. In a case where the set time or the set place is changed by the setting unit, the mobile-object control unit instructs the mobile object to change the set time or the set place.

An information processing method of the third aspect of the present technology includes: setting a set time and a set place; instructing a mobile object to be present at the set place at the set time; and instructing the mobile object to change the set time or the set place in a case where the set time or the set place is changed.

A program of the third aspect of the present technology causes a computer to execute processing including: setting a set time and a set place; instructing a mobile object to be present at the set place at the set time; and instructing the mobile object to change the set time or the set place in a case where the set time or the set place is changed.

In the first aspect of the present technology, an operation of the mobile object is controlled to be present at a set place at a set time, and notification is controlled in a case where at least one of the set time or the set place cannot be achieved.

In the second aspect of the present technology, the drive unit is controlled to cause the mobile object to be present at the set place at the set time, and notification is controlled in a case where at least one of the set time or the set place cannot be achieved.

In the third aspect of the present technology, the set time and set place are set, the mobile object is instructed to be present at the set place at the set time, and the mobile object is instructed to change the set time or the set place in a case where the set time or the set place is changed.

MODE FOR CARRYING OUT THE INVENTION

Hereinafter, an embodiment for implementing the present technology will be described. The description will be given in the following order.
1. Embodiment
2. Modified Example
3. Other 1. Embodiment First, an embodiment of the present technology will be described with reference to FIGS. 1 to 13.

<Configuration Example of Vehicle Calling System 1>

Figure 1:
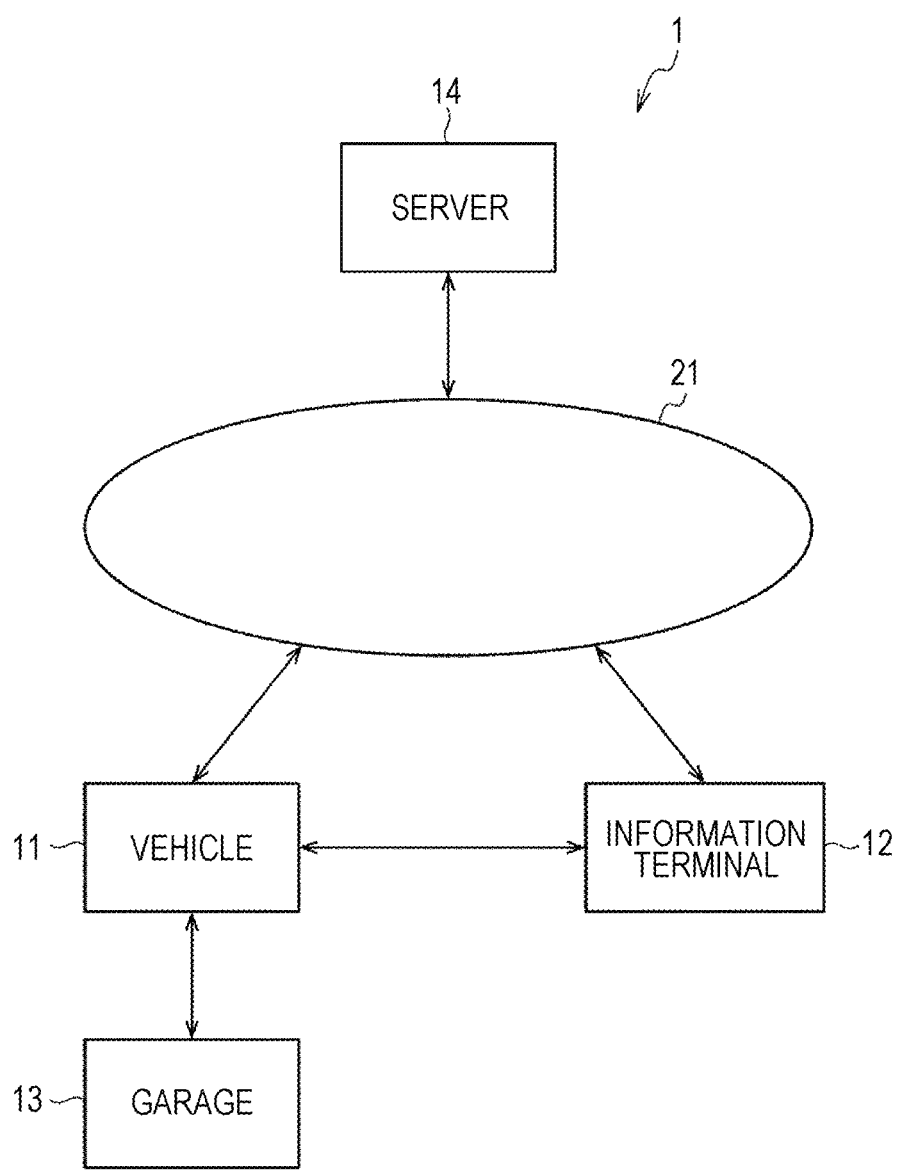
FIG. 1 is a block diagram showing an embodiment of a vehicle calling system to which the present technology is applied.

FIG. 1 is a block diagram showing a configuration example of a vehicle calling system 1 to which the present technology is applied.

The vehicle calling system 1 is a system that can call a vehicle 11 to be present at a desired place (hereinafter referred to as a set place) at a desired time (hereinafter referred to as a set time), and return the vehicle 11 to a garage 13.

The vehicle calling system 1 includes the vehicle 11, an information terminal 12, the garage 13, a server 14, and a network 21. The vehicle 11, the information terminal 12, and the server 14 are connected to each other via the network 21 and communicate with each other. The vehicle 11 and the information terminal 12 can also directly communicate with each other without via the network 21.

The vehicle 11 is a vehicle capable of automatic driving. The vehicle 11 goes to a set place at the set time and returns to the garage 13, while communicating with the information terminal 12 or the server 14 via the network 21.

The information terminal 12 is held by a user who calls the vehicle 11, and transmits an instruction such as a call or parking-space entry to the garage 13, to the vehicle 11. Furthermore, the information terminal 12 notifies the user of a current location and peripheral information transmitted from the vehicle 11.

The garage 13 is a garage for the vehicle 11, and is provided, for example, at home of the user who owns the vehicle 11. The garage 13 can be opened and closed by remote control by the vehicle 11.

The server 14 proposes call conditions (the set time and the set place) of the vehicle 11 to the information terminal 12 (the user). Furthermore, the server 14 proposes, to the vehicle 11 or the information terminal 12 (the user), a change plan of the set place, the set time, a route to the set place, and the like. Moreover, the server 14 provides the vehicle 11 and the information terminal 12 with information (for example, map information, traffic jam information, construction information, and the like) necessary for setting the call condition and creating the change plan.

<Configuration Example of Vehicle Control System>

Figure 2:
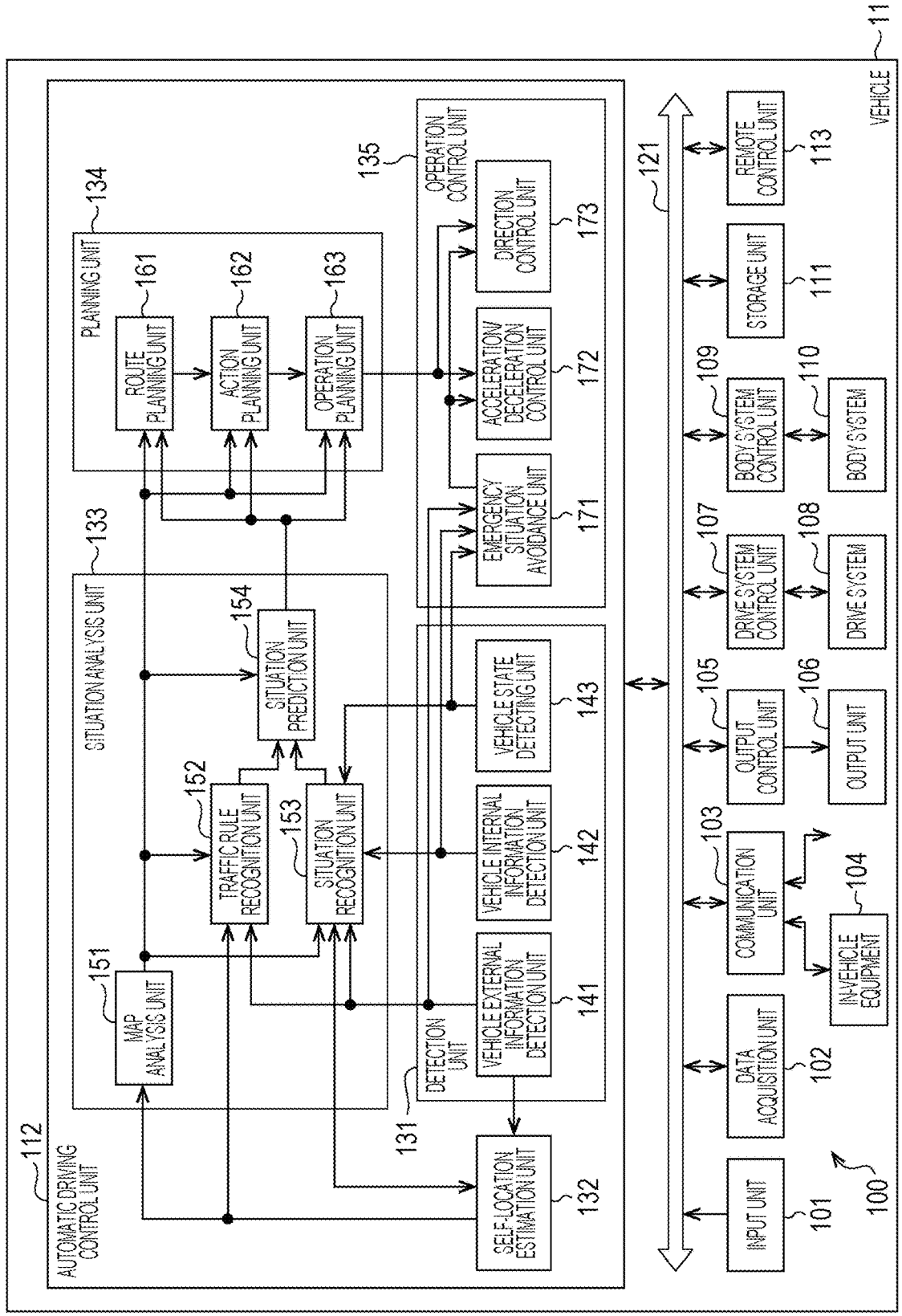
FIG. 2 is a block diagram showing a configuration example of a vehicle control system.

FIG. 2 is an example of a mobile-object control system to which the present technology can be applied, and is a block diagram showing a configuration example of a schematic function of a vehicle control system 100 provided in the vehicle 11.

Note that, hereinafter, in a case of distinguishing from other vehicles, the vehicle 11 provided with the vehicle control system 100 is referred to as an own vehicle or an own car.

The vehicle control system 100 includes an input unit 101, a data acquisition unit 102, a communication unit 103, in-vehicle equipment 104, an output control unit 105, an output unit 106, a drive system control unit 107, a drive system 108, a body system control unit 109, a body system 110, a storage unit 111, an automatic driving control unit 112, and a remote control unit 113. The input unit 101, the data acquisition unit 102, the communication unit 103, the output control unit 105, the drive system control unit 107, the body system control unit 109, the storage unit 111, the automatic driving control unit 112, and the remote control unit 113 are mutually connected via a communication network 121. The communication network 121 includes, for example, a bus and an in-vehicle communication network conforming to any standard, such as a controller area network (CAN), a local interconnect network (LIN), a local area network (LAN), or FlexRay (registered trademark). Note that there may be a case where each unit of the vehicle control system 100 is directly connected without via the communication network 121.

Note that, hereinafter, in a case where each unit of the vehicle control system 100 communicates via the communication network 121, the description of the communication network 121 is to be omitted. For example, in a case where the input unit 101 and the automatic driving control unit 112 communicate via the communication network 121, it is simply described that the input unit 101 and the automatic driving control unit 112 communicate.

The input unit 101 includes a device used by a passenger for inputting various data, instructions, and the like. For example, the input unit 101 includes: operation devices such as a touch panel, a button, a microphone, a switch, and a lever; an operation device that can be inputted by a method other than manual operation, such as with voice or a gesture; and the like. Furthermore, for example, the input unit 101 may be a remote control device using infrared ray or other radio waves, or external connection equipment such as mobile equipment or wearable equipment corresponding to an operation of the vehicle control system 100. The input unit 101 generates an input signal on the basis of data, instructions, and the like inputted by the passenger, and supplies to each unit of the vehicle control system 100.

The data acquisition unit 102 includes various sensors and the like that acquire data to be used for processing of the vehicle control system 100, and supplies the acquired data to each unit of the vehicle control system 100.

For example, the data acquisition unit 102 includes various sensors for detection of a state and the like of the own vehicle. Specifically, for example, the data acquisition unit 102 includes a gyro sensor, an acceleration sensor, an inertial measurement unit (IMU), and a sensor and the like for detection of an accelerator pedal operation amount, a brake pedal operation amount, a steering angle of a steering wheel, an engine speed, a motor speed, a wheel speed, and the like.

Furthermore, for example, the data acquisition unit 102 includes various sensors for detection of information external to the own vehicle. Specifically, for example, the data acquisition unit 102 includes an imaging device such as a time of flight (ToF) camera, a stereo camera, a monocular camera, an infrared camera, and other camera. Furthermore, for example, the data acquisition unit 102 includes an environment sensor for detection of weather, meteorological phenomena, or the like, and a peripheral information detection sensor for detection of an object around the own vehicle. The environment sensor includes, for example, a raindrop sensor, a fog sensor, a sunshine sensor, a snow sensor, and the like. The peripheral information detection sensor includes, for example, an ultrasonic sensor, a radar, light detection and ranging or laser imaging detection and ranging (LiDAR), a sonar, and the like.

Moreover, for example, the data acquisition unit 102 includes various sensors for detection of a current location of the own vehicle. Specifically, for example, the data acquisition unit 102 includes a global navigation satellite system (GNSS) receiver or the like that receives a GNSS signal from a GNSS satellite.

Furthermore, for example, the data acquisition unit 102 includes various sensors for detection of internal information of the vehicle. Specifically, for example, the data acquisition unit 102 includes an imaging device configured to capture an image of a driver, a biological sensor configured to detect biological information of the driver, a microphone configured to collect sound in a vehicle interior, and the like. The biological sensor is provided on, for example, a seat surface, a steering wheel, and the like, and detects biological information of the passenger sitting on the seat or the driver gripping the steering wheel.

The communication unit 103 communicates with the in-vehicle equipment 104, and various types of equipment, a server, a base station, and the like external to the vehicle, to transmit data supplied from each unit of the vehicle control system 100 and supply the received data to each unit of the vehicle control system 100. Note that a communication protocol supported by the communication unit 103 is not particularly limited, and the communication unit 103 can also support a plurality of types of communication protocols.

For example, the communication unit 103 performs wireless communication with the in-vehicle equipment 104 through wireless LAN, Bluetooth (registered trademark), near field communication (NFC), a wireless USB (WUSB), or the like. Furthermore, for example, the communication unit 103 performs wired communication with the in-vehicle equipment 104 through a universal serial bus (USB), a high-definition multimedia interface (HDMI) (registered trademark), a mobile high-definition link (MHL), or the like, via a connection terminal (not illustrated) (and a cable if necessary).

Moreover, for example, via a base station or an access point, the communication unit 103 communicates with equipment (for example, an application server or a control server) existing on an external network (for example, the Internet, a cloud network, or a network unique to a business operator). Furthermore, for example, the communication unit 103 uses a peer to peer (P2P) technology to communicate with a terminal (for example, a terminal of a pedestrian or a store, or a machine type communication (MTC) terminal) existing near the own vehicle. Moreover, for example, the communication unit 103 performs V2X communication such as vehicle-to-vehicle communication, vehicle-to-infrastructure communication, communication between the own vehicle and a house (vehicle-to-home), and vehicle-to-pedestrian communication. Furthermore, for example, the communication unit 103 includes a beacon reception unit, and receives radio waves or electromagnetic waves transmitted from a wireless station or the like installed on a road, and acquires information such as a current location, traffic jam, traffic regulation, a required time, and the like.

The in-vehicle equipment 104 includes, for example, mobile equipment or wearable equipment owned by the passenger, information equipment carried in or attached to the own vehicle, a navigation device that searches for a route to any given destination, and the like.

The output control unit 105 controls output of various information to the passenger of the own vehicle or outside of the vehicle. For example, the output control unit 105 controls output of visual information and auditory information from the output unit 106 by generating an output signal including at least one of visual information (for example, image data) or auditory information (for example, sound data), and supplying to the output unit 106. Specifically, for example, the output control unit 105 combines image data captured by different imaging devices of the data acquisition unit 102 to generate an overhead view image, a panoramic image, or the like, and supplies an output signal including the generated image to the output unit 106. Furthermore, for example, the output control unit 105 generates sound data including warning sound, a warning message, or the like for dangers such as collision, contact, entry into danger zone, and the like, and supplies an output signal including the generated sound data to the output unit 106.

The output unit 106 includes a device capable of outputting visual information or auditory information to the passenger of the own vehicle or outside of the vehicle. For example, the output unit 106 includes a display device, an instrument panel, audio speakers, headphones, a wearable device such as a glasses-type display worn by the passenger, a projector, a lamp, and the like. The display device provided to the output unit 106 may be, for example, a device that displays visual information in a driver's field of view, such as a device or the like having a head-up display, a transmissive display, or an augmented reality (AR) display function, in addition to a device having a normal display.

The drive system control unit 107 controls the drive system 108 by generating various control signals and supplying to the drive system 108. Furthermore, the drive system control unit 107 supplies a control signal to each unit other than the drive system 108 as necessary, and gives notification or the like of a control state of the drive system 108.

The drive system 108 includes various devices related to a drive system of the own vehicle. For example, the drive system 108 includes: a driving force generation device for generation of a driving force such as an internal combustion engine or a driving motor, a driving force transmission mechanism for transmission of a driving force to wheels, a steering mechanism to adjust a steering angle, a braking device to generate a braking force, an antilock brake system (ABS), an electronic stability control (ESC), an electric power steering device, and the like.

The body system control unit 109 controls the body system 110 by generating various control signals and supplying to the body system 110. Furthermore, the body system control unit 109 supplies a control signal to each unit other than the body system 110 as necessary, and gives notification or the like of a control state of the body system 110.

The body system 110 includes various body system devices of mounted on the vehicle body. For example, the body system 110 includes a keyless entry system, a smart key system, a power window device, a power seat, a steering wheel, an air conditioner, various lamps (for example, such as a head lamp, a back lamp, a brake lamp, a turn indicator, and a fog lamp), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the vehicle control system 100. For example, the storage unit 111 stores map data such as a three-dimensional high-accuracy map such as a dynamic map, a global map that is less accurate than the high-accuracy map and covers a wide area, and a local map that includes information of surroundings of the own vehicle.

The automatic driving control unit 112 performs control related to automatic driving such as autonomous traveling or driving assistance. Specifically, for example, the automatic driving control unit 112 performs cooperative control for the purpose of realizing functions of advanced driver assistance system (ADAS) including avoidance of collisions or mitigation of impacts of the own vehicle, follow-up traveling based on a distance between vehicles, vehicle speed maintenance traveling, collision warning of the own vehicle, lane departure warning of the own vehicle, and the like. Furthermore, for example, the automatic driving control unit 112 performs cooperative control for the purpose of automatic driving or the like of autonomously traveling without depending on an operation of the driver. The automatic driving control unit 112 includes a detection unit 131, a self-location estimation unit 132, a situation analysis unit 133, a planning unit 134, and an operation control unit 135.

The detection unit 131 detects various kinds of information necessary for controlling the automatic driving. The detection unit 131 includes a vehicle external information detection unit 141, a vehicle internal information detection unit 142, and a vehicle state detection unit 143.

The vehicle external information detection unit 141 performs detection processing on information external to the own vehicle, on the basis of data or a signal from each unit of the vehicle control system 100. For example, the vehicle external information detection unit 141 performs detection processing, recognition processing, and tracking processing on an object around the own vehicle, and detection processing on a distance to the object. Objects to be detected include, for example, vehicles, people, obstacles, structures, roads, traffic lights, traffic signs, road markings, and the like. Furthermore, for example, the vehicle external information detection unit 141 performs detection processing on a surrounding environment of the own vehicle. The surrounding environment to be detected includes, for example, weather, a temperature, a humidity, a brightness, road surface conditions, and the like. The vehicle external information detection unit 141 supplies data indicating a result of the detection processing to the self-location estimation unit 132, a map analysis unit 151, a traffic rule recognition unit 152, a situation recognition unit 153 of the situation analysis unit 133, an emergency situation avoidance unit 171 of the operation control unit 135, and the like.

The vehicle internal information detection unit 142 performs detection processing on internal information of the vehicle on the basis of data or a signal from each unit of the vehicle control system 100. For example, the vehicle internal information detection unit 142 performs diver authentication processing and recognition processing, driver's state detection processing, passenger detection processing, detection processing on an environment inside the vehicle, and the like. The driver's state to be detected includes, for example, a physical condition, an awakening degree, a concentration degree, a fatigue degree, a line-of-sight direction, and the like. The environment inside the vehicle to be detected includes, for example, a temperature, a humidity, a brightness, odor, and the like. The vehicle internal information detection unit 142 supplies data indicating a result of the detection processing to the situation recognition unit 153 of the situation analysis unit 133, the emergency situation avoidance unit 171 of the operation control unit 135, and the like.

The vehicle state detection unit 143 performs detection processing on a state of the own vehicle, on the basis of data or a signal from each unit of the vehicle control system 100. The state of the own vehicle to be detected includes, for example, a velocity, an acceleration, a steering angle, the presence/absence and contents of an abnormality, a state of driving operation, a position and inclination of a power seat, a state of a door lock, a state of other in-vehicle equipment, and the like. The vehicle state detection unit 143 supplies data indicating a result of the detection processing to the situation recognition unit 153 of the situation analysis unit 133, the emergency situation avoidance unit 171 of the operation control unit 135, and the like.

The self-location estimation unit 132 performs estimation processing on, for example, a location and a position of the own vehicle, on the basis of data or a signal from each unit of the vehicle control system 100, such as the vehicle external information detection unit 141, and the situation recognition unit 153 of the situation analysis unit 133. Furthermore, the self-location estimation unit 132 generates a local map (hereinafter, referred to as a self-location estimation map) to be used for self-location estimation, as necessary. The self-location estimation map is, for example, a highly accurate map using a technology such as simultaneous localization and mapping (SLAM). The self-location estimation unit 132 supplies data indicating a result of the estimation processing to the map analysis unit 151, the traffic rule recognition unit 152, and the situation recognition unit 153 of the situation analysis unit 133, and the like. Furthermore, the self-location estimation unit 132 causes the storage unit 111 to store the self-location estimation map.

The situation analysis unit 133 performs analysis processing on a situation of the own vehicle and the surroundings. The situation analysis unit 133 includes the map analysis unit 151, the traffic rule recognition unit 152, the situation recognition unit 153, and a situation prediction unit 154.

While using data or a signal from each unit of the vehicle control system 100 such as the self-location estimation unit 132 and the vehicle external information detection unit 141 as necessary, the map analysis unit 151 performs analysis processing on various maps stored in the storage unit 111, and constructs a map including information necessary for processing of automatic driving. The map analysis unit 151 supplies the constructed map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs recognition processing on traffic rules around the own vehicle, on the basis of data or a signal from each unit of the vehicle control system 100 such as the self-location estimation unit 132, the vehicle external information detection unit 141, and the map analysis unit 151. By this recognition processing, for example, a location and a state of traffic lights around the own vehicle, contents of traffic regulation around the own vehicle, a lane that can be traveled, and the like are recognized. The traffic rule recognition unit 152 supplies data indicating a result of the recognition processing to the situation prediction unit 154 and the like.

The situation recognition unit 153 performs situation recognition processing related to the own vehicle, on the basis of data or a signal from each unit of the vehicle control system 100 such as the self-location estimation unit 132, the vehicle external information detection unit 141, the vehicle internal information detection unit 142, the vehicle state detection unit 143, and the map analysis unit 151. For example, the situation recognition unit 153 performs recognition processing on a situation of the own vehicle, a situation around the own vehicle, a situation of the driver of the own vehicle, and the like. Furthermore, the situation recognition unit 153 generates a local map (hereinafter, referred to as a situation recognition map) used for recognizing a situation around the own vehicle, as necessary. The situation recognition map is, for example, an occupancy grid map.

The situation of the own vehicle to be recognized includes, for example, a location, a position, and a motion (for example, a velocity, an acceleration, a moving direction, and the like) of the own vehicle, the presence/absence and contents of an abnormality, and the like. The situation around the own vehicle to be recognized includes, for example, a type and a location of a surrounding stationary object, a type, a location, and a motion (for example, a velocity, an acceleration, a moving direction, and the like) of a surrounding moving object, a configuration of a surrounding road and a condition of a road surface, surrounding weather, temperature, humidity, and brightness, and the like. The driver's state to be recognized includes, for example, a physical condition, an awakening degree, a concentration degree, a fatigue degree, a motion of a line-of-sight, driving operation, and the like.

The situation recognition unit 153 supplies data indicating a result of the recognition processing (including the situation recognition map as necessary) to the self-location estimation unit 132, the situation prediction unit 154, and the like. Furthermore, the situation recognition unit 153 causes the storage unit 111 to store the situation recognition map.

The situation prediction unit 154 performs prediction processing on a situation related to the own vehicle, on the basis of data or a signal from each unit of the vehicle control system 100 such as the map analysis unit 151, the traffic rule recognition unit 152, and the situation recognition unit 153. For example, the situation prediction unit 154 performs prediction processing on a situation of the own vehicle, a situation around the own vehicle, a situation of a driver, and the like.

The situation of the own vehicle to be predicted includes, for example, a behavior of the own vehicle, an occurrence of an abnormality, a traveling distance, and the like. The situation around the own vehicle to be predicted includes, for example, a behavior of a moving object around the own vehicle, a change in a signal state, a change in an environment such as weather, and the like. The situation of the driver to be predicted includes, for example, a behavior, a physical condition, and the like of the driver.

The situation prediction unit 154 supplies data indicating a result of the prediction processing, together with data from the traffic rule recognition unit 152 and the situation recognition unit 153, to the route planning unit 161, the action planning unit 162, and the operation planning unit 163 of the planning unit 134, and the like.

The route planning unit 161 plans a route to a destination on the basis of data or a signal from each unit of the vehicle control system 100 such as the map analysis unit 151 and the situation prediction unit 154. For example, the route planning unit 161 sets a route from a current location to a designated destination on the basis of the global map. Furthermore, for example, the route planning unit 161 changes a route as appropriate on the basis of a situation such as traffic jam, an accident, traffic restriction, and construction, a physical condition of the driver, and the like. The route planning unit 161 supplies data indicating the planned route to the action planning unit 162 and the like.

The action planning unit 162 plans an action of the own vehicle for safely traveling on the route planned by the route planning unit 161 within a planned time, on the basis of data or a signal from each unit of the vehicle control system 100 such as the map analysis unit 151 and the situation prediction unit 154. For example, the action planning unit 162 plans start, stop, a traveling direction (for example, forward, backward, left turn, right turn, direction change, and the like), a traveling lane, a traveling speed, overtaking, and the like. The action planning unit 162 supplies data indicating the planned action of the own vehicle to the operation planning unit 163 and the like.

The operation planning unit 163 plans an operation of the own vehicle for realizing an action planned by the action planning unit 162, on the basis of data or a signal from each unit of the vehicle control system 100 such as the map analysis unit 151 and the situation prediction unit 154. For example, the operation planning unit 163 plans acceleration, deceleration, a traveling trajectory, and the like. The operation planning unit 163 supplies data indicating the planned operation of the own vehicle to an acceleration/deceleration control unit 172 and a direction control unit 173 of the operation control unit 135, and the like.

The operation control unit 135 controls an operation of the own vehicle. The operation control unit 135 includes the emergency situation avoidance unit 171, the acceleration/deceleration control unit 172, and the direction control unit 173.

The emergency situation avoidance unit 171 performs detection processing on emergency situations such as a collision, contact, entry into a danger zone, a driver abnormality, and a vehicle abnormality, on the basis of detection results of the vehicle external information detection unit 141, the vehicle internal information detection unit 142, and the vehicle state detection unit 143. In a case of detecting an occurrence of an emergency situation, the emergency situation avoidance unit 171 plans an operation of the own vehicle to avoid the emergency situation, such as a sudden stop or a sharp turn. The emergency situation avoidance unit 171 supplies data indicating the planned operation of the own vehicle to the acceleration/deceleration control unit 172, the direction control unit 173, and the like.

The acceleration/deceleration control unit 172 performs acceleration/deceleration control for realizing the operation of the own vehicle planned by the operation planning unit 163 or the emergency situation avoidance unit 171. For example, the acceleration/deceleration control unit 172 calculates a control target value of the driving force generation device or the braking device to achieve a planned acceleration and deceleration or a sudden vehicle stop, and supplies a control command indicating the calculated control target value to the drive system control unit 107.

The direction control unit 173 performs direction control for realizing the operation of the own vehicle planned by the operation planning unit 163 or the emergency situation avoidance unit 171. For example, the direction control unit 173 calculates a control target value of a steering mechanism for achieving a traveling trajectory or a sharp turn planned by the operation planning unit 163 or the emergency situation avoidance unit 171, and supplies a control command indicating the calculated control target value to the drive system control unit 107.

The remote control unit 113 performs remote control on equipment (for example, the garage 13) external to the own vehicle.

<Configuration Example of Output Control Unit 105 and Remote Control Unit 113>

Figure 3:
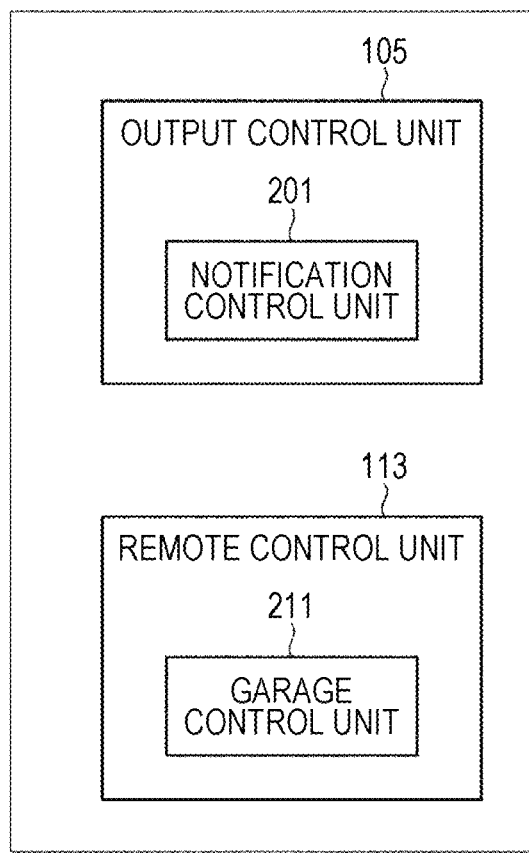
FIG. 3 is a block diagram showing a configuration example of an output control unit and a remote control unit.

FIG. 3 is a block diagram showing a part of a configuration example of the output control unit 105 and the remote control unit 113 of the vehicle control system 100.

The output control unit 105 includes a notification control unit 201. The notification control unit 201 controls a current location and peripheral information of the vehicle 11 and notification to the information terminal 12 such as completion of parking-space entry.

The remote control unit 113 includes a garage control unit 211. The garage control unit 211 controls opening and closing of the garage 13.

<Configuration Example of Information Terminal 12>

Figure 4:
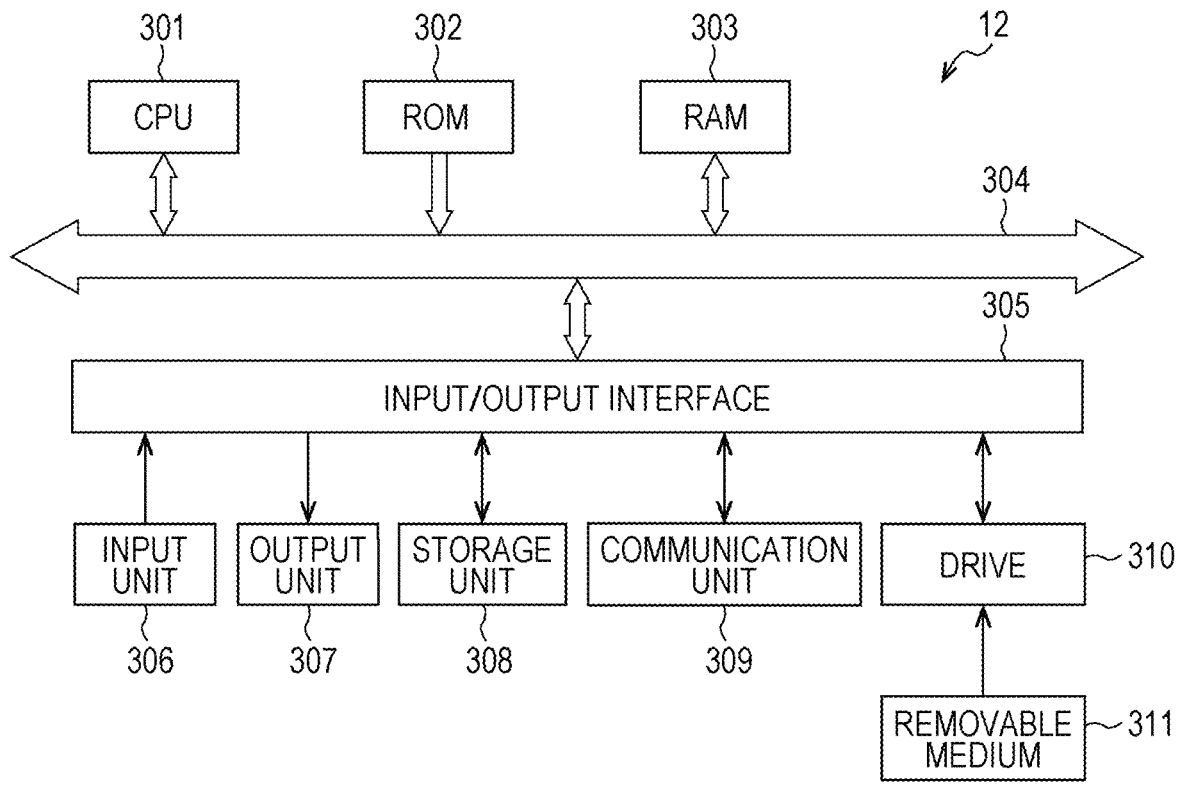
FIG. 4 is a block diagram showing a configuration example of a server.

FIG. 4 is a block diagram showing a configuration example of the information terminal 12.

In the information terminal 12, a central processing unit (CPU) 301, a read only memory (ROM) 302, and a random access memory (RAM) 303 are mutually connected by a bus 304.

The bus 304 is further connected with an input/output interface 305. To the input/output interface 305, an input unit 306, an output unit 307, a storage unit 308, a communication unit 309, and a drive 310 are connected.

The input unit 306 includes an input device such as a touch panel, a switch, a button, and a microphone.

The output unit 307 includes an output device such as a display and a speaker.

The storage unit 308 includes a hard disk, a non-volatile memory, and the like.

The communication unit 309 includes a network interface and the like.

The drive 310 drives a removable medium 311 such as a magnetic disk, an optical disk, a magneto-optical disk, or a semiconductor memory.

Note that, hereinafter, in a case where each unit of the information terminal 12 communicates via the bus 304 and the input/output interface 305, the description of the bus 304 and the input/output interface 305 will be omitted. For example, in a case where the CPU 301 and the communication unit 309 communicate via the bus 304 and the input/output interface 305, it is simply described that the CPU 301 and the communication unit 309 communicate.

<Configuration Example of Information Processing Unit 351>

Figure 5:
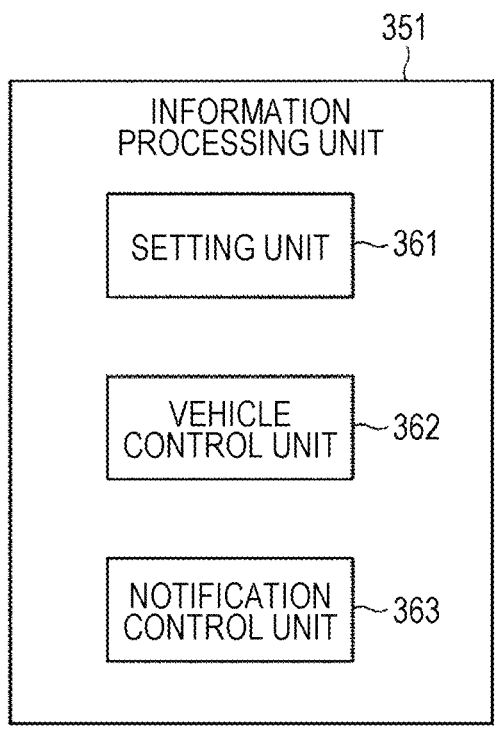
FIG. 5 is a block diagram showing a configuration example of an information processing unit.

FIG. 5 is a block diagram showing a configuration example of a function of an information processing unit 351 realized when the CPU 301 of the information terminal 12 executes a predetermined control program.

The information processing unit 351 includes a setting unit 361, a vehicle control unit 362, and a notification control unit 363.

The setting unit 361 sets and changes a set time and a set place at a time of calling the vehicle 11, on the basis of a user's instruction, a change plan received from the vehicle 11, various information provided from the server 14, and the like.

The vehicle control unit 362 communicates with the vehicle 11 via the communication unit 309 and the network 21, to instruct call and parking-space entry of the vehicle 11, and instruct change of a call condition. Furthermore, as necessary, the vehicle control unit 362 transmits information required to create a set time, a set place, and a change plan of a route to the set place (for example, a current location of the information terminal 12, a user's action schedule, and the like) to the vehicle 11 via the communication unit 309 and the network 21.

The notification control unit 363 controls the notification, to the user, of the information received from the vehicle 11, by controlling the output unit 307.

<Processing of Vehicle Calling System 1>

Next, processing of the vehicle calling system 1 will be described with reference to FIGS. 6 to 12.

<Calling Processing>

First, with reference to flowcharts of FIGS. 6 and 7, calling processing executed by the information terminal 12 will be described.

In step S1, the information terminal 12 transmits a call signal to the vehicle 11.

For example, in a case of calling the vehicle 11, the user inputs a desired time, place, and the like via the input unit 306. The input unit 306 supplies the data inputted by the user, to the setting unit 361. The setting unit 361 sets the time and the place inputted by the user to the set time and the set place. The vehicle control unit 362 generates a call signal including the set time and the set place, and transmits to the vehicle 11 via the communication unit 309 and the network 21.

The vehicle 11 receives the call signal in step S101 of FIG. 8 described later.

In step S2, the vehicle control unit 362 determines whether or not a route has been proposed by the vehicle 11.

For example, the vehicle 11 transmits a route notification signal in step S102 of FIG. 8 or step S118 of FIG. 9, which will be described later. The route notification signal includes, for example, a route to the set place, a departure time, and an estimated arrival time at a via-point on the route and the set place.

On the other hand, in a case where the vehicle control unit 362 receives the route notification signal transmitted from the vehicle 11 via the network 21 and the communication unit 309, the vehicle control unit 362 determines that the route has been proposed from the vehicle 11, and the process proceeds to step S3.

In step S3, the information terminal 12 notifies the vehicle 11 of propriety of the route. For example, the output unit 307 displays the route proposed by the vehicle 11, under the control of the notification control unit 363. The user determines whether or not to approve the proposed route, and inputs the determined result via the input unit 306. The input unit 306 supplies the data inputted by the user to the vehicle control unit 362. The vehicle control unit 362 generates a route propriety notification signal including data indicating whether or not the route has been approved, and transmits to the vehicle 11 via the communication unit 309 and the network 21.

On the other hand, the vehicle 11 receives the route propriety notification signal in step S103 of FIG. 8 or step S119 of FIG. 9, which will be described later.

Thereafter, the process proceeds to step S4.

Whereas, in a case where it is determined in step S2 that the route has not been proposed by the vehicle 11, the process of step S3 is skipped, and the process proceeds to step S4.

In step S4, the setting unit 361 determines whether or not to change the call condition.

For example, in a case where the user desires to change at least one of the set time or the set place, the user inputs a change content via the input unit 306. This assumes, for example, a case where the user cannot reach the set place by the set time due to private business, a delay in public transportation, or the like. Furthermore, for example, a case is assumed in which a schedule of the user is changed and time or a place convenient for joining with the vehicle 11 is changed. The input unit 306 supplies the data inputted by the user, to the setting unit 361. On the other hand, the setting unit 361 determines that the call condition is changed, and the process proceeds to step S5.

In step S5, the vehicle control unit 362 instructs the vehicle 11 to change the call condition. Specifically, the setting unit 361 changes at least one of the set time or the set place on the basis of the change content inputted by the user. The vehicle control unit 362 generates a call condition change signal including the changed set time and set place, and transmits to the vehicle 11 via the communication unit 309 and the network 21.

On the other hand, the vehicle 11 receives the call condition change signal in step S106 of FIG. 8 or step S117 of FIG. 9, which will be described later.

Thereafter, the process proceeds to step S6.

Whereas, in a case where it is determined in step S4 that the call condition is not to be changed, the process of step S5 is skipped, and the process proceeds to step S6.

In step S6, the vehicle control unit 362 determines whether or not notification of a current location and peripheral information from the vehicle 11 has been started.

For example, after departing for the set place in step S110 of FIG. 8 described later, the vehicle 11 starts transmitting a situation notification signal including the current location and the peripheral information of the vehicle 11 in step S111. The peripheral information includes, for example, an image around the vehicle 11.

On the other hand, in a case where the vehicle control unit 362 starts receiving the situation notification signal transmitted from the vehicle 11 via the network 21 and the communication unit 309, the vehicle control unit 362 determines that notification of the current location and the peripheral information from the vehicle 11 has been started, and the process proceeds to step S7.

In step S7, the information terminal 12 starts notifying the user of the current location and the peripheral information. For example, the output unit 307 starts displaying the current location and the peripheral information of the vehicle 11, under the control of the notification control unit 363.

Thereafter, the process proceeds to step S8.

Whereas, in a case where it is determined in step S6 that the notification of the current location and the peripheral information from the vehicle 11 has not been started, the process of step S7 is skipped, and the process proceeds to step S8.

In step S8, the vehicle control unit 362 determines whether or not the vehicle 11 is unable to achieve the call condition.

Figure 11:
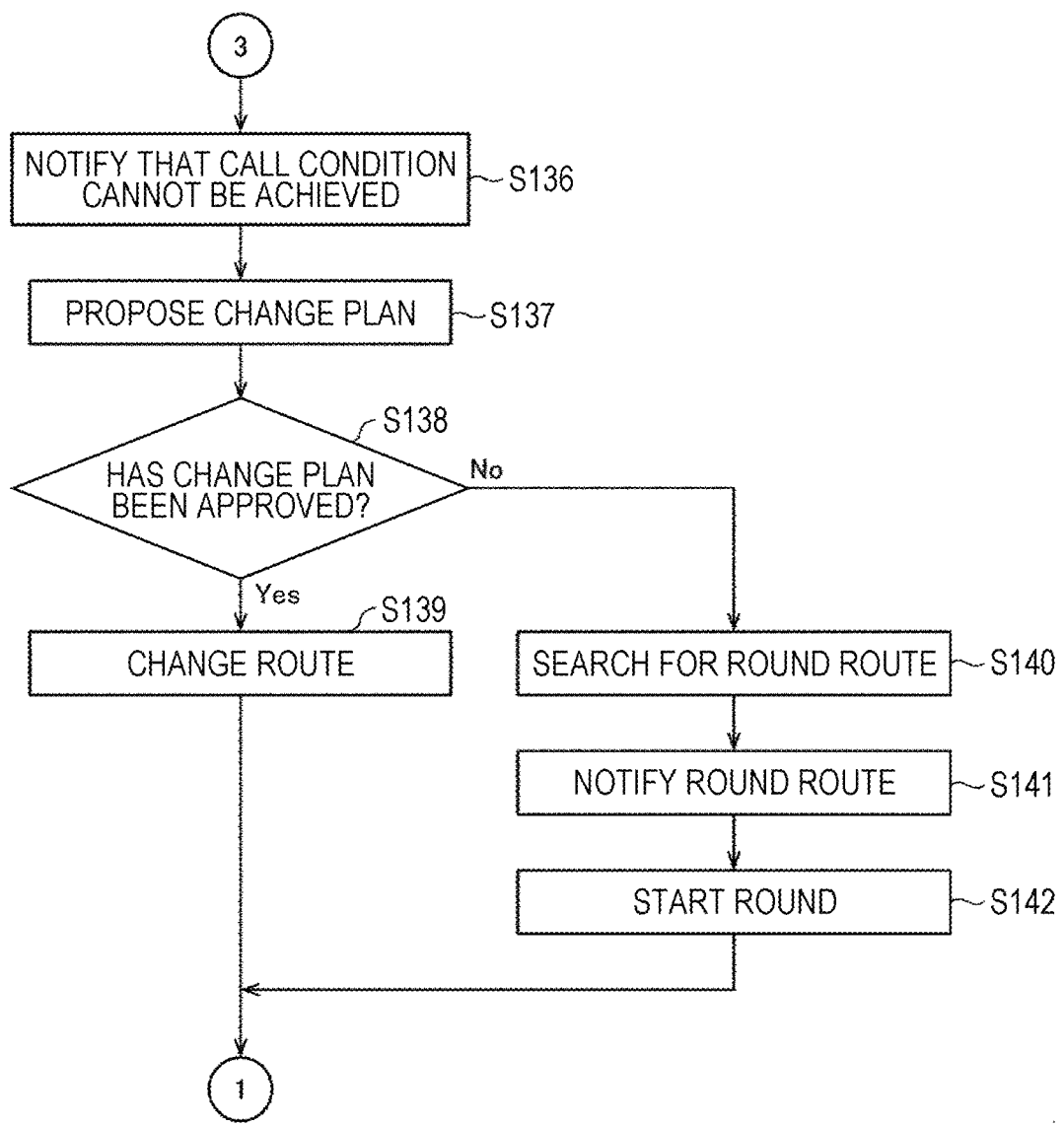
FIG. 11 is a flowchart for explaining call handling processing.

For example, in a case of being unable to achieve the call condition (for example, in a case of being unable to reach the set place by the set time, in a case of being unable to stop the vehicle at the set place, or the like), the vehicle 11 transmits a call condition incapability signal for notifying that the call condition cannot be achieved in step S113 of FIG. 9 or step S136 of FIG. 11, which will be described later. The call condition incapability signal includes, for example, data indicating a reason why the call condition cannot be achieved, an estimated arrival time at the set place, and the like.

On the other hand, in a case where the vehicle control unit 362 receives the call incapability signal transmitted from the vehicle 11 via the network 21 and the communication unit 309, the vehicle control unit 362 determines that the vehicle 11 cannot achieve the call condition, and the process proceeds to step S9.

In step S9, the information terminal 12 notifies the user that the vehicle 11 cannot achieve the call condition. For example, the output unit 307 displays information notifying that the vehicle 11 cannot achieve the call condition, under the control of the notification control unit 363. At this time, for example, the reason why the call condition cannot be achieved, the estimated arrival time at the set place, and the like are displayed.

Thereafter, the process proceeds to step S10.

Whereas, in a case where it is determined in step S8 that the vehicle 11 can achieve the call condition, the process of step S9 is skipped, and the process proceeds to step S10.

In step S10, the setting unit 361 determines whether or not the change plan has been proposed by the vehicle 11.

For example, in a case of being unable to achieve the call condition, the vehicle 11 transmits a change plan notification signal in step S114 of FIG. 9 or step S137 of FIG. 11, which will be described later. The change plan notification signal includes a change plan of at least one of the set time, the set place, or route, and the estimated arrival time at the set place and a via-point on the route after the change.

On the other hand, in a case where the vehicle control unit 362 receives the change plan notification signal transmitted from the vehicle 11 via the network 21 and the communication unit 309, the vehicle control unit 362 determines that the change plan has been proposed from the vehicle 11, and the process proceeds to step S11.

In step S11, the information terminal 12 notifies the vehicle 11 of propriety of the change plan. For example, the output unit 307 displays information indicating the change plan proposed by the vehicle 11, under the control of the notification control unit 363. The user determines whether or not to approve the proposed change plan, and inputs the determined result via the input unit 306. The input unit 306 supplies the data inputted by the user, to the setting unit 361. In a case where the user proposes the change plan, the setting unit 361 changes the set time and the set place as necessary on the basis of the change plan. The vehicle control unit 362 generates a change plan propriety notification signal including data indicating whether or not the change plan has been approved, and transmits to the vehicle 11 via the communication unit 309 and the network 21.

On the other hand, the vehicle 11 receives the change plan propriety notification signal in step S115 of FIG. 9 or step S138 of FIG. 11, which will be described later.

Thereafter, the process proceeds to step S12.

Whereas, in a case where it is determined in step S10 that the change plan has not been proposed by the vehicle 11, the process of step S11 is skipped, and the process proceeds to step S12.

In step S12, the vehicle control unit 362 determines whether or not a round route has been notified from the vehicle 11.

For example, as will be described later, in a case where it is difficult to stand by at the set place, the vehicle 11 rounds around the set place. Then, in step S126 or step S134 of FIG. 10, which will be described later, or step S141 of FIG. 11, the vehicle 11 transmits a round route notification signal including data indicating the round route.

On the other hand, in a case where the vehicle control unit 362 receives the round route notification signal transmitted from the vehicle 11 via the network 21 and the communication unit 309, the vehicle control unit 362 determines that the round route has been notified from the vehicle 11, and the process proceeds to step S13.

In step S13, the information terminal 12 notifies the user of the round route. For example, the output unit 307 displays information indicating the round route of the vehicle 11, under the control of the notification control unit 363.

Thereafter, the process proceeds to step S14.

Whereas, in a case where it is determined in step S12 that the round route has not been notified from the vehicle 11, the process of step S13 is skipped, and the process proceeds to step S14.

In step S14, the vehicle control unit 362 determines whether or not the user has joined with the vehicle 11. For example, in a case where a difference between the current location of the information terminal 12 and the current location of the vehicle 11 is equal to or greater than a predetermined threshold value, the vehicle control unit 362 determines that the user has not joined with the vehicle 11, and the process returns to step S2.

Thereafter, until it is determined in step S14 that the user has joined with the vehicle 11, the processes of steps S2 to S14 are repeatedly executed.

Whereas, in step S14, in a case where a difference between the current location of the information terminal 12 and the current location of the vehicle 11 is less than the predetermined threshold value, the vehicle control unit 362 determines that the user has joined with the vehicle 11, and the calling processing ends.

<Call Handling Processing>

Next, with reference to flowcharts of FIGS. 8 to 11, a description is given to call handling processing executed by the vehicle 11 in response to the calling processing of the information terminal 12 described above.

In step S101, the vehicle 11 receives a call signal. Specifically, the communication unit 103 receives a call signal transmitted from the information terminal 12 via the network 21 in step S1 of FIG. 6. The communication unit 103 supplies the call signal to the route planning unit 161.

In step S102, the vehicle 11 proposes a route. Specifically, the route planning unit 161 searches for, for example, a route that allows reaching the set place by the set time on the basis of data or a signal from each unit of the vehicle control system 100, and selects one of the detected routes. For example, a route is selected on the basis of parameters such as a traveling time, a traveling distance, and a cost. Whereas, in a case of being unable to detect a route that allows reaching the set place by the set time, the route planning unit 161 searches for, for example, a route that allows reaching the set place earliest, and selects the detected route.

Furthermore, the route planning unit 161 sets a departure time and predicts an estimated arrival time at a via-point on the route and the set place. The route planning unit 161 generates a route notification signal including the route to the set place, the departure time, and the estimated arrival time at the via-point on the route and the set place, and transmits to the information terminal 12 via the communication unit 103 and the network 21.

In step S103, the route planning unit 161 determines whether or not the route has been approved. Specifically, the route planning unit 161 receives the route propriety notification signal transmitted from the information terminal 12 in step S3 of FIG. 6, via the network 21 and the communication unit 103. Then, in a case where the route planning unit 161 determines that the route has not been approved on the basis of the route propriety notification signal, the process returns to step S102.

Thereafter, until it is determined in step S103 that the route has been approved, the processes of steps S102 and S103 are repeatedly executed, and the route is changed and proposed.

Whereas, in step S103, in a case where the route planning unit 161 determines that the route has been approved on the basis of the route propriety notification signal, the process proceeds to step S104.

In step S104, the planning unit 134 sets the route. Specifically, the route planning unit 161 supplies data indicating the approved route, to the action planning unit 162 and the like. The action planning unit 162 plans an action of the vehicle 11 for safely traveling on the approved route and arriving at the set place by the set time.

In step S105, the action planning unit 162 determines whether or not the departure time has arrived. In a case where it is determined that the departure time has not arrived, the process proceeds to step S106.

In step S106, the route planning unit 161 determines whether or not a change of the call condition has been instructed. In a case where it is determined that a change of the call condition has not been instructed, the process returns to step S106.

Thereafter, until it is determined in step S105 that the departure time has arrived, or it is determined in step S105 that a change of the call condition has been instructed, the processes of steps S105 and S106 are repeatedly executed.

Figure 6:
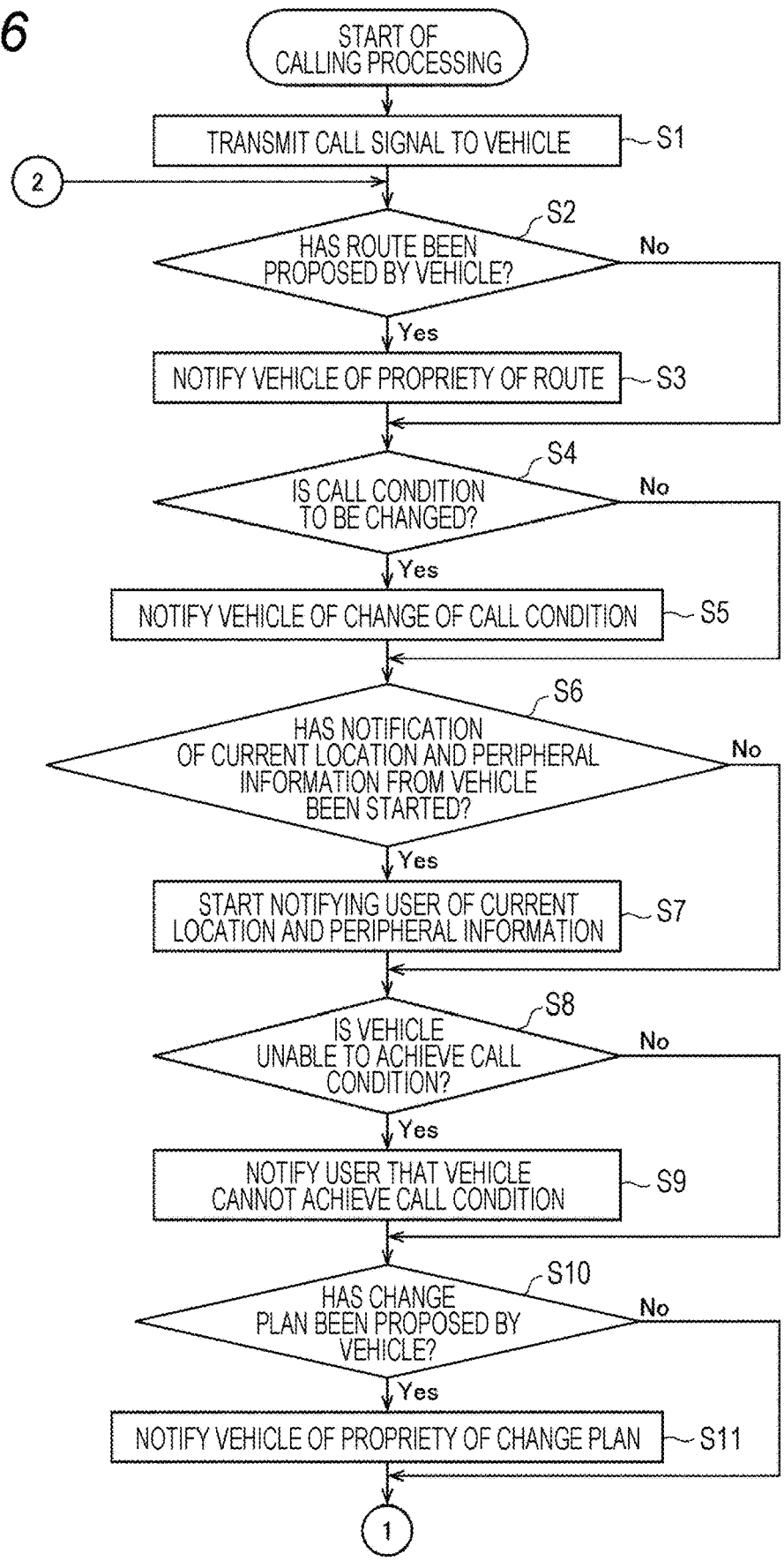
FIG. 6 is a flowchart for explaining calling processing.
Figure 7:
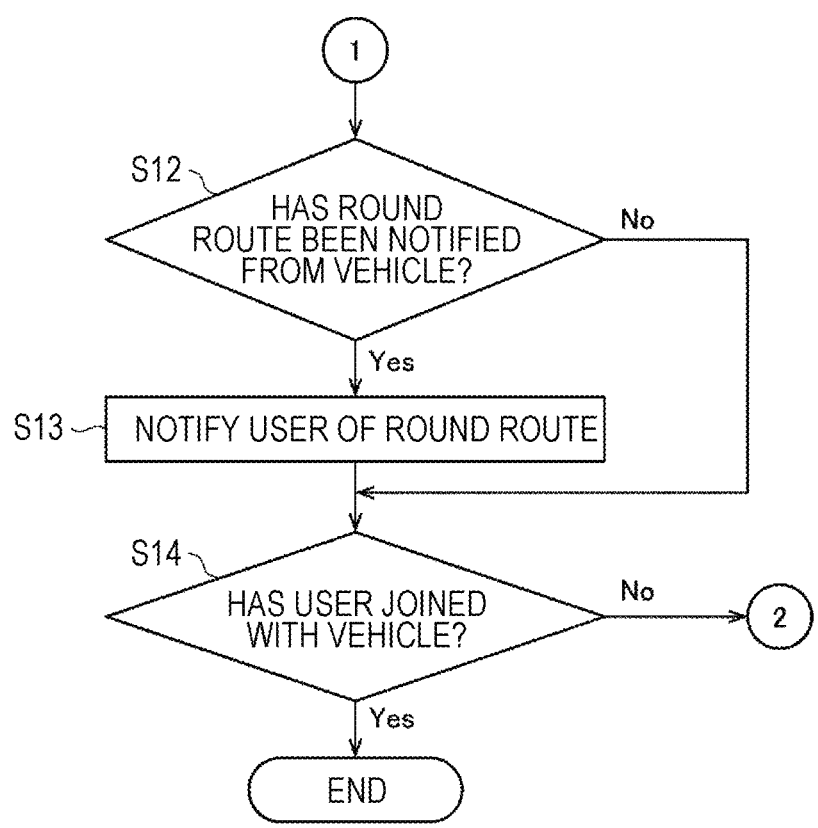
FIG. 7 is a flowchart for explaining calling processing.

Whereas, in step S106, in a case where the route planning unit 161 receives the call condition change signal transmitted from the information terminal 12 in step S5 of FIG. 6 via the network 21 and the communication unit 103, the route planning unit 161 determines that a change of the call condition has been instructed, and the process returns to step S102.

Thereafter, the processes in and after step S102 are executed. This processing causes the route to be changed in accordance with the changed call condition.

Whereas, in a case where it is determined in step S105 that the departure time has arrived, the process proceeds to step S107.

In step S107, the vehicle 11 opens the garage 13. Specifically, the garage control unit 211 generates an open instruction signal for opening the garage 13, and transmits to the garage 13 via the communication unit 103.

On the other hand, the garage 13 opens an opening/closing part (for example, such as a shutter or a door) at an entrance.

In step S108, the vehicle 11 exits from the garage 13. Specifically, the drive system control unit 107 controls the vehicle 11 to move until going out of the garage 13, by controlling the drive system 108 under the control of the operation control unit 135.

In step S109, the vehicle 11 closes the garage 13. Specifically, the garage control unit 211 generates a close instruction signal for closing the garage 13, and transmits to the garage 13 via the communication unit 103.

On the other hand, the garage 13 closes the opening/closing part of the entrance.

Note that, for example, in a case where the opening/closing part is not provided at the entrance of the garage 13, or in a case where the vehicle 11 is not parked in the garage 13, the processes of steps S107 to S109 are omitted.

In step S110, the vehicle 11 departs for the set place. Specifically, the action planning unit 162 supplies data indicating a planned action to the operation planning unit 163 and the like. The operation planning unit 163 starts a process of, on the basis of data or a signal from each unit of the vehicle control system 100, planning an operation of the vehicle 11 for realizing the action planned by the action planning unit 162, and controlling the drive system control unit 107 and the like. This processing causes the vehicle 11 to start traveling toward the set place in accordance with the approved route.

In step S111, the vehicle 11 starts notifying the current location and the peripheral information. Specifically, the notification control unit 201 generates a situation notification signal including the current location and the peripheral information of the vehicle 11, and starts a process of transmitting to the information terminal 12 via the communication unit 103 and the network 21.

The situation notification signal includes, for example, a self-location of the vehicle 11 estimated by the self-location estimation unit 132, an image of surroundings of the vehicle 11 obtained by an imaging device included in the data acquisition unit 102, and the like.

In step S112, the action planning unit 162 determines whether or not the set time is to be met. The action planning unit 162 estimates an estimated arrival time at the set place at the present moment on the basis of data or a signal from each unit of the vehicle control system 100. In a case where the estimated arrival time is later than the set time, the action planning unit 162 determines that the set time is not to be met, and the process proceeds to step S113.

In step S113, the action planning unit 162 notifies that the call condition cannot be achieved. Specifically, the action planning unit 162 generates a call incapability signal for notifying that the call condition cannot be achieved, and transmits to the information terminal 12 via the communication unit 103 and the network 21. Note that the call incapability signal includes, for example, a reason why the call condition cannot be achieved, an estimated arrival time at the set place, and the like. In this case, as the reason why the call condition cannot be achieved, the fact that the set time is not to be met is notified.

In step S114, the route planning unit 161 proposes a change plan.

For example, the route planning unit 161 searches for a route that allows reaching the current set place by the current set time, on the basis of data or a signal from each unit of the vehicle control system 100. In a case where the route planning unit 161 can detect a relevant route, the route planning unit 161 predicts an estimated arrival time at a via-point on the route and the set place. The route planning unit 161 generates a change plan notification signal including the changed route and the estimated arrival time at the via-point on the route and the set place, and transmits to the information terminal 12 via the communication unit 103 and the network 21.

Whereas, in a case of being unable to detect a relevant route, the route planning unit 161 searches for an alternative location for the set place, for example, on the basis of some of the current location of the vehicle 11, the current location of the user (the information terminal 12), an action schedule of the user, map information, traffic jam information, construction information, and the like. In a case of having been able to detect an appropriate alternative location, the route planning unit 161 sets the detected alternative location as a new set place.

For example, the new set place is set on the basis of one or more of the following conditions.

A waiting time of the user is short.
A traveling distance of the user is short.
It is possible to join with the user quickly.
It is on a movement route of the user.

It is easy for the user to reach.
It is easy for the user to find the vehicle 11.
The user can safely board the vehicle 11.
A traveling distance of the vehicle 11 is short.
It is easy for the vehicle 11 to reach.
It is easy for the vehicle 11 to stop.

The route planning unit 161 predicts a route to the new set place, and an estimated arrival time at a via-point on the route and the set place. Furthermore, the route planning unit 161 sets, for example, the estimated arrival time at the new set place as a new set time. The route planning unit 161 generates a change plan notification signal including the new set place, the route to the set place, and an estimated arrival time at the via-point on the route and the set place, and transmits to the information terminal 12 via the communication unit 103 and the network 21.

Furthermore, in a case of being unable to find an appropriate alternative location, the route planning unit 161 predicts, for example, the estimated arrival time at the via-point on the route and the set place, and the like, while keeping the current route. Furthermore, the route planning unit 161 sets, for example, the estimated arrival time at the current set place as a new set time. The route planning unit 161 generates a change plan notification signal including the route to the set place, and the estimated arrival time at the via-point on the route and the set place, and transmits to the information terminal 12 via the communication unit 103 and the network 21.

In step S115, the route planning unit 161 determines whether or not the change plan has been approved. Specifically, the route planning unit 161 receives a change plan propriety notification signal transmitted from the information terminal 12 in step S11 of FIG. 6, via the network 21 and the communication unit 103. Then, in a case where the route planning unit 161 determines that the change plan has been approved on the basis of the change plan propriety notification signal, the process proceeds to step S116.

In step S116, the planning unit 134 changes the route. Specifically, the route planning unit 161 supplies data indicating the approved route, to the action planning unit 162 and the like. The action planning unit 162 plans an action of the vehicle 11 for safely traveling on the approved route and arriving at the set place by the set time, and supplies data indicating the planned action to the operation planning unit 163 and the like. The operation planning unit 163 starts a process of, on the basis of data or a signal from each unit of the vehicle control system 100, planning an operation of the vehicle 11 for realizing the action planned by the action planning unit 162, and controlling the drive system control unit 107 and the like. This processing causes the vehicle 11 to start traveling toward the set place in accordance with the changed route. However, as described above, in a case where only the set time is changed without change of the route, the vehicle 11 continues to travel in accordance with the current route.

Thereafter, the process proceeds to step S117.

Whereas, in step S115, in a case where the route planning unit 161 determines that the change plan has not been approved on the basis of the change plan propriety notification signal, the process of step S116 is skipped, and the process proceeds to step S117. That is, in this case, the route is not changed, and the vehicle 11 continues to travel in accordance with the current route with the current set place and set time.

Furthermore, in step S112, in a case where the estimated arrival time at the set place is the same as the set time or earlier than the set time, the action planning unit 162 determines that the set time is to be met, the processes of steps S113 to S116 are skipped, and the process proceeds to step S117.

In step S117, similarly to the process of step S106, it is determined whether or not a change of the call condition has been instructed. In a case where it is determined that a change of the call condition has been instructed, the process proceeds to step S118.

In step S118, similarly to the process of step S102, a route is proposed. That is, a route in which at least one of the set time or the set place has been changed by the user's instruction is proposed to the user (the information terminal 12).

In step S119, similarly to the process of step S103, it is determined whether or not the route has been approved. In a case where it is determined that the route has been approved, the process proceeds to step S120.

In step S120, similarly to the process of step S116, the route is changed.

Thereafter, the process proceeds to step S121.

Whereas, in a case where it is determined in step S119 that the route has not been approved, the process of step S120 is skipped, and the process proceeds to step S121. That is, in this case, the call condition is not changed, and the vehicle 11 continues to travel in accordance with the current route with the current set place and set time.

Furthermore, in a case where it is determined in step S117 that a change of the call condition has not been instructed, the processes of steps S118 to S120 are skipped, and the process proceeds to step S121.

In step S121, the action planning unit 162 determines whether or not the set place has been reached, on the basis of data or a signal from each unit of the vehicle control system 100. In a case where it is determined that the set place has not been reached, the process returns to step S112.

Thereafter, until it is determined in step S112 that the set place has been reached, the processes of steps S112 to S121 are repeatedly executed.

Whereas, in a case where it is determined in step S121 that the set place has been reached, the process proceeds to step S122.

In step S122, the situation recognition unit 153 determines whether or not the set place is appropriate on the basis of data or a signal from each unit of the vehicle control system 100. For example, in a case the set place has a space that allows the vehicle 11 to stop and is suitable for the user to board the stopped vehicle 11, the situation recognition unit 153 determines that the set place is appropriate, and the process proceeds to step S123. Note that, even if the vehicle 11 cannot stop at the present moment due to another vehicle being stopped and the like, it is determined that the set place is appropriate as long as the set place has a space that allows the vehicle 11 to stop and a space suitable for the user to board the stopped vehicle 11.

In step S123, the action planning unit 162 determines whether or not there is time until the set time. In a case where a remaining time until the set time is equal to or greater than a predetermined threshold value, the action planning unit 162 determines that there is time until the set time, and the process proceeds to step S124.

In step S124, the route planning unit 161 searches for a round route. For example, around the set place, the route planning unit 161 searches for a round route that allows returning to the set place by the set time, on the basis of data or a signal from each unit of the vehicle control system 100.

Note that the number of rounds on the round route is not limited to one, and may be two or more. That is, a round route that arrows returning to the set place by the set time after two or more rounds may be searched for.

In step S125, the route planning unit 161 determines whether or not there is an appropriate round route. In a case where the route planning unit 161 can detect a round route that allows returning to the set place by the set time, the route planning unit 161 determines that there is an appropriate round route, and the process proceeds to step S126.

In step S126, the route planning unit 161 notifies the round route. Specifically, the route planning unit 161 generates a round route notification signal including data indicating the round route, and transmits to the information terminal 12 via the communication unit 103 and the network 21.

In step S127, the vehicle 11 starts the round. Specifically, the route planning unit 161 supplies data indicating the round route to the action planning unit 162 and the like. The action planning unit 162 plans an action of the vehicle 11 for safely traveling on the round route and returning to the set place by the set time, and supplies data indicating the planned action to the operation planning unit 163 and the like. The operation planning unit 163 starts a process of, on the basis of data or a signal from each unit of the vehicle control system 100, planning an operation of the vehicle 11 for realizing the action planned by the action planning unit 162, and controlling the drive system control unit 107 and the like. This processing causes the vehicle 11 to start the round in accordance with the round route.

Thereafter, the process returns to step S112, and the processes of steps S112 to S121 are repeatedly executed until it is determined in step S121 that the set place is reached, that is, until the vehicle 11 returns to the set place.

Note that, in a case where the call condition can no longer be achieved during the round, for example, in a case of being unable to return to the set place by the set time, a change plan is proposed, and the route will be changed when the user approves. Furthermore, in a case where a change of the call condition has been instructed during the round, a route corresponding to the changed call condition is proposed, and the route will be changed when the user approves.

Whereas, in step S125, in a case where the route planning unit 161 cannot detect a round route that allows returning to the set place by the set time, the route planning unit 161 determines that there is no appropriate round route, and the process proceeds to step S128.

Furthermore, in step S123, in a case where the remaining time until the set time is less than the predetermined threshold value, the action planning unit 162 determines that there is no time until the set time, and the process proceeds to step S128.

In step S128, the situation recognition unit 153 determines whether or not the vehicle can stop at the set place, on the basis of data or a signal from each unit of the vehicle control system 100. In a case where it is determined that the vehicle can stop at the set place, the process proceeds to step S129.

In step S129, the vehicle 11 stops at the set place. Specifically, the drive system control unit 107 controls the drive system 108 under the control of the operation control unit 135, to control the vehicle 11 to stop at the set place.

In step S130, the situation recognition unit 153 determines whether or not the vehicle 11 has joined with the user. In a case where the information terminal 12 is not detected within a predetermined range around the vehicle 11 on the basis of data or a signal from each unit of the vehicle control system 100, the situation recognition unit 153 determines that the vehicle 11 has not joined with the user, and the process proceeds to step S131.

In step S131, the situation recognition unit 153 determines whether or not it is possible to stand by at the set place, on the basis of data or a signal from each unit of the vehicle control system 100. In a case where it is determined that it is possible to stand by at the set place, the process returns to step S130.

Thereafter, the processes of steps S130 and S131 are repeatedly executed until it is determined in step S130 that the vehicle 11 has joined with the user or that it is not possible to stand by at the set place in step S131.

Whereas, in a case where it is determined in step S131 that it is not possible to stand by at the set place, the process proceeds to step S132. This is a case where it becomes necessary to control the vehicle 11 to move due to a reason such as, for example, an increase in the number of other vehicles around the set place.

In step S132, similarly to the process of step S124, a round route is searched for.

In step S133, similarly to the process of step S125, it is determined whether or not there is an appropriate round route. In a case where it is determined that there is an appropriate round route, the process proceeds to step S134.

In step S134, similarly to the process of step S126, the round route is notified.

In step S135, similarly to the process of step S127, the round is started. That is, since the vehicle 11 can no longer stand by at the set place, the vehicle 11 starts the round so as to return to the set place by the set time.

Thereafter, the process returns to step S112, and the processes of steps S112 to S121 are repeatedly executed until it is determined in step S121 that the set place is reached, that is, until the vehicle 11 returns to the set place.

Note that, in a case where the call condition can no longer be achieved during the round, for example, in a case of being unable to return to the set place by the set time, a change plan is proposed, and the route will be changed when the user approves. Furthermore, in a case where a change of the call condition has been instructed during the round, a route corresponding to the changed call condition is proposed, and the route will be changed when the user approves.

Whereas, in a case where it is determined in step S133 that there is no appropriate round route, the process proceeds to step S136. This is a case where the round route that allows returning to the set place by the set time cannot be found in a case where the vehicle 11 can no longer stand by at the set place.

Furthermore, in a case where it is determined in step S128 that the vehicle cannot stop at the set place, the process proceeds to step S136. This is a case where the vehicle 11 cannot stop at the set place even if there is no time until the set time, or a case where there is time until the set time but the round route that allows the vehicle 11 to return to the set place by the set time cannot be found, and the vehicle cannot stop at the set place.

Moreover, in step S122, for example, in a case where the set place does not have a space to allow the vehicle 11 to stop, or a case where the set place has no suitable space for the user to board the stopped vehicle 11, the situation recognition unit 153 determines that the set place is not appropriate, and the process proceeds to step S136. This is a case where, for example, the set place has no space to allow the vehicle 11 to stop due to construction work or prohibition of parking/stopping, it is dangerous for the user to move to the stop position, or the like.

In step S136, similarly to the process of step S113, it is notified that the call condition cannot be achieved. Note that, at this time, the call incapability signal includes data indicating a reason why the set place is inappropriate, the vehicle cannot stop at the set place but there is no appropriate round route, the vehicle cannot stop at the set place at the set time, or the like.

In step S137, similarly to the process of step S114, a change plan is proposed.

In step S138, similarly to the process of step S115, it is determined whether or not the change plan has been approved. In a case where it is determined that the change plan has been approved, the process proceeds to step S139.

In step S139, similarly to the process of step S120, the route is changed.

Thereafter, the process returns to step S112, and the processes of steps S112 to S121 are repeatedly executed until it is determined in step S121 that the set place has been reached.

Note that, in a case of being no longer able to achieve the call condition by the time when arriving at the set place, for example, a case of being no longer able to arrive at the set place by the set time, a change plan is proposed, and the route will be changed when the user approves. Furthermore, in a case where a change of the call condition has been instructed by the time of arriving at the set place, a route corresponding to the changed call condition is proposed, and the route will be changed when the user approves.

Whereas, in a case where it is determined in step S138 that the change plan has not been approved, the process proceeds to step S140.

In step S140, similarly to the process of step S124, a round route is searched for. Note that, here, since the vehicle 11 cannot stop at the set place at the set time, it is not necessary to return to the set place by the set time for now, so that a route that arrows the round near the set place is searched for.

In step S141, similarly to the process of step S126, the round route is notified.

In step S142, similarly to the process of step S127, the round is started.

Thereafter, the process returns to step S112, and the processes of steps S112 to S121 are repeatedly executed until it is determined in step S121 that the set place has been reached.

Note that, in this case, since the call condition cannot be achieved, a change plan is proposed during the round, and the route will be changed when the user approves. Furthermore, in a case where a change of the call condition has been instructed during the round, a route corresponding to the changed call condition is proposed, and the route will be changed when the user approves.

Whereas, in step S130, in a case where the situation recognition unit 153 detects the information terminal 12 within a predetermined range around the vehicle 11, the situation recognition unit 153 determines that the vehicle 11 has joined with the user, and the call handling processing ends.

As described above, the user can call the vehicle 11 at a desired place at a desired time and reliably board the vehicle 11. Furthermore, the user can freely change the time and the place for boarding the vehicle 11. Furthermore, even if the vehicle 11 cannot achieve the call condition, the change plan is proposed, so that the user can board the vehicle 11 at an appropriate time and at an appropriate place.

<Parking-Space Entry Instruction Processing>

Figure 12:
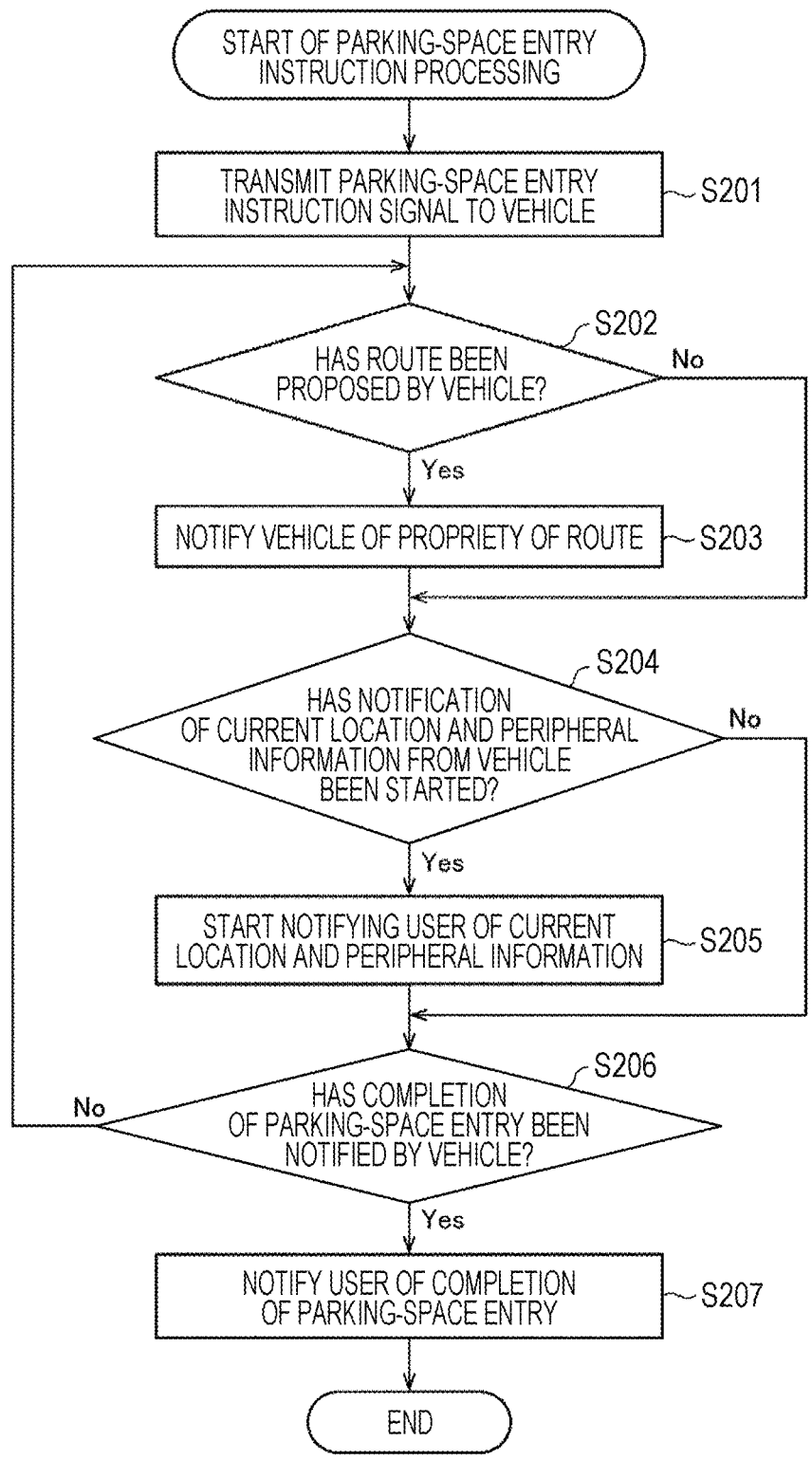
FIG. 12 is a flowchart for explaining parking-space entry instruction processing.

Next, with reference to a flowchart of FIG. 12, parking-space entry instruction processing executed by the information terminal 12 will be described.

In step S201, the information terminal 12 transmits a parking-space entry instruction signal to the vehicle 11.

For example, in a case of instructing the vehicle 11 of parking-space entry to the garage 13, the user inputs the parking-space entry instruction via the input unit 306. The input unit 306 supplies the data inputted by the user to the vehicle control unit 362.

The vehicle control unit 362 generates a parking-space entry instruction signal including a location of the garage 13 and the like, and transmits to the vehicle 11 via the communication unit 309 and the network 21.

The vehicle 11 receives the parking-space entry instruction signal in step S301 of FIG. 13, which will be described later.

In step S202, similarly to the process of step S2 of FIG. 6, it is determined whether or not a route has been proposed by the vehicle 11. In a case where it is determined that the route has been proposed by the vehicle 11, the process proceeds to step S203.

In step S203, similarly to the process of step S3 of FIG. 6, the vehicle 11 is notified of propriety of the route. This processing causes a route propriety notification signal to be transmitted to the vehicle 11.

On the other hand, the vehicle 11 receives the route propriety notification signal in step S303 of FIG. 13, which will be described later.

In step S204, similarly to the process of step S6 of FIG. 6, it is determined whether or not notification of a current location and peripheral information from the vehicle 11 has been started. In a case where it is determined that the notification of the current location and the peripheral information from the vehicle 11 has started, the process proceeds to step S205.

In step S205, similarly to the process of step S7 of FIG. 6, the notification of the current location and the peripheral information to the user is started.

Thereafter, the process proceeds to step S206.

Whereas, in a case where it is determined in step S204 that the notification of the current location and the peripheral information from the vehicle 11 has not been started, the process of step S205 is skipped, and the process proceeds to step S206.

In step S206, the vehicle control unit 362 determines whether or not completion of parking-space entry has been notified by the vehicle 11.

For example, after the parking-space entry of the vehicle 11 in the garage 13 is completed, the vehicle 11 transmits a parking-space entry completion notification signal for notifying the completion of parking-space entry.

On the other hand, in a case where the vehicle control unit 362 has not received the parking-space entry completion notification signal, the vehicle control unit 362 determines that completion of parking-space entry has not been notified by the vehicle 11, and the process returns to step S202.

Thereafter, until it is determined in step S206 that completion of parking-space entry has been notified by the vehicle 11, the processes of steps S202 to S206 are repeatedly executed.

Whereas, in step S206, in a case where the vehicle control unit 362 receives the parking-space entry completion notification signal transmitted from the vehicle 11 via the network 21 and the communication unit 309, the vehicle control unit 362 determines that completion of parking-space entry has been notified from the vehicle 11, and the process proceeds to step S207.

In step S207, the information terminal 12 notifies the user of the completion of parking-space entry. For example, the output unit 307 displays a screen for notifying the completion of parking-space entry of the vehicle 11 to the garage 13, under the control of the notification control unit 363.

Thereafter, the parking-space entry instruction processing ends.

<Parking-Space Entry Processing>

Figure 13:
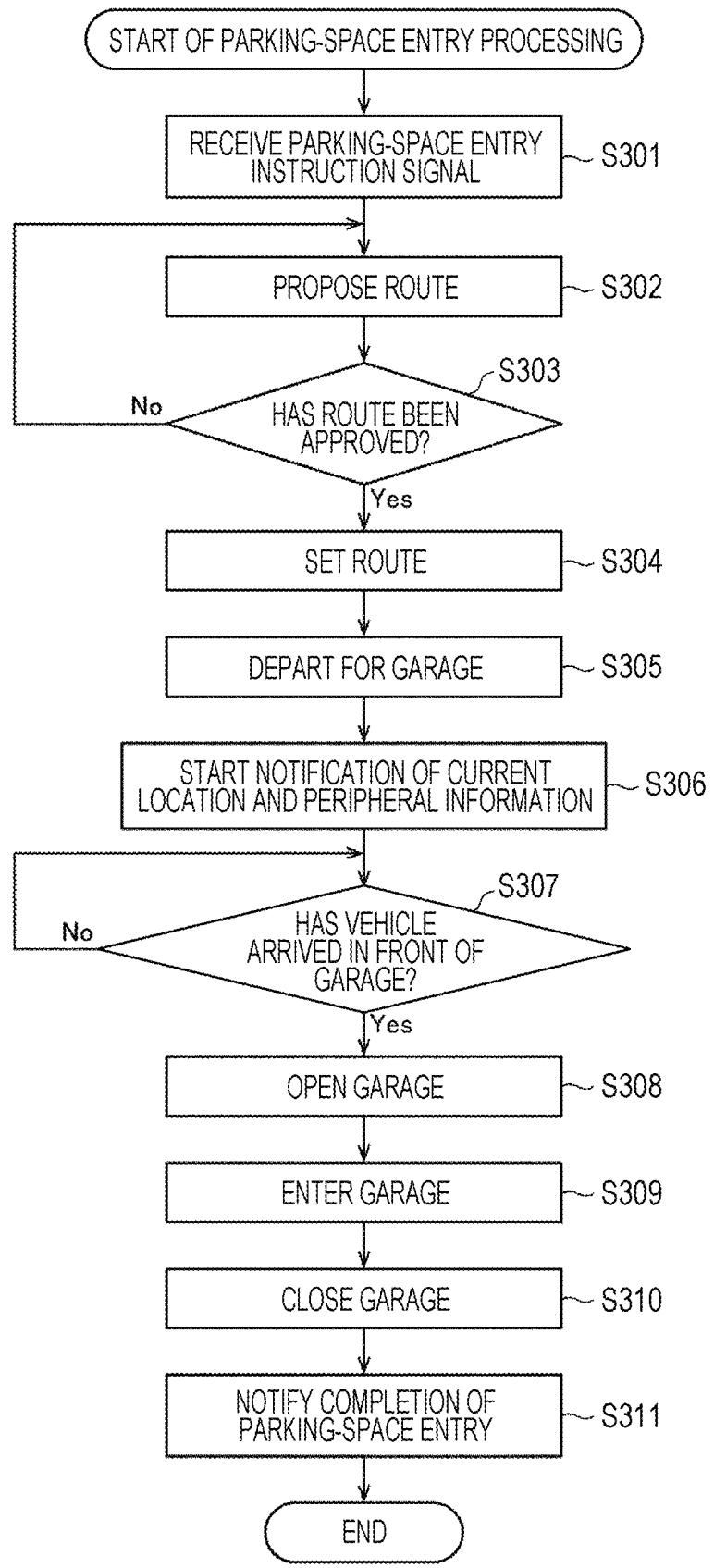
FIG. 13 is a flowchart for explaining parking-space entry processing.

Next, with reference to a flowchart of FIG. 13, a description is given to parking-space entry processing executed by the vehicle 11 in response to the parking-space entry instruction processing of the information terminal 12 described above.

In step S301, the vehicle 11 receives the parking-space entry instruction signal. Specifically, the communication unit 103 receives the parking-space entry instruction signal transmitted from the information terminal 12 via the network 21 in step S201 of FIG. 12. The communication unit 103 supplies the parking-space entry instruction signal to the route planning unit 161.

In step S302, the vehicle 11 proposes a route. Specifically, the route planning unit 161 searches for a route to the garage 13 on the basis of data or a signal from each unit of the vehicle control system 100, and selects one of the detected routes. For example, a route is selected on the basis of parameters such as a traveling time, a traveling distance, and a cost. The route planning unit 161 generates a route notification signal including the route to the garage 13 and an estimated arrival time at a via-point on the route and the garage 13, and transmits to the information terminal 12 via the communication unit 103 and the network 21.

Figure 8:
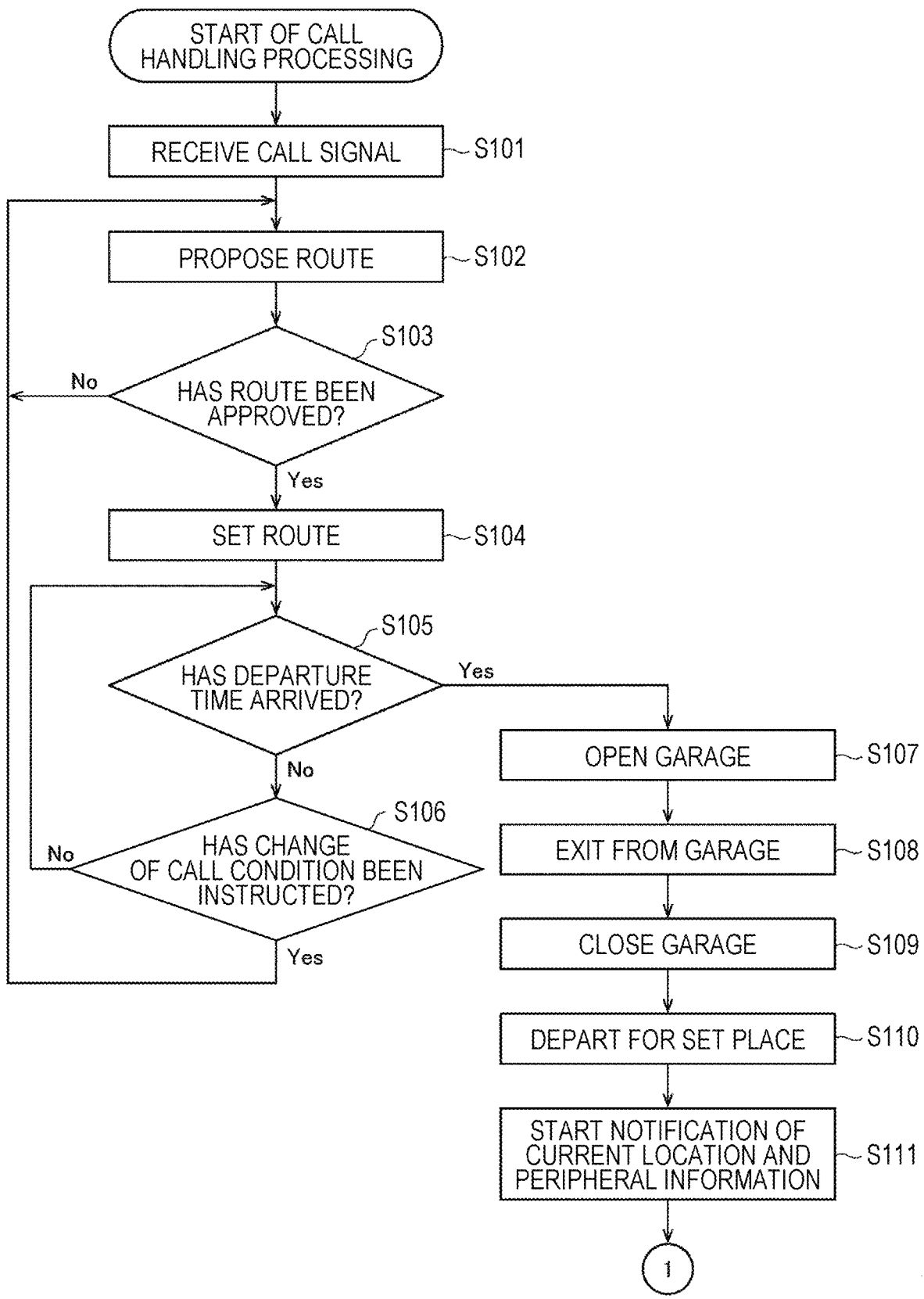
FIG. 8 is a flowchart for explaining call handling processing.
Figure 9:
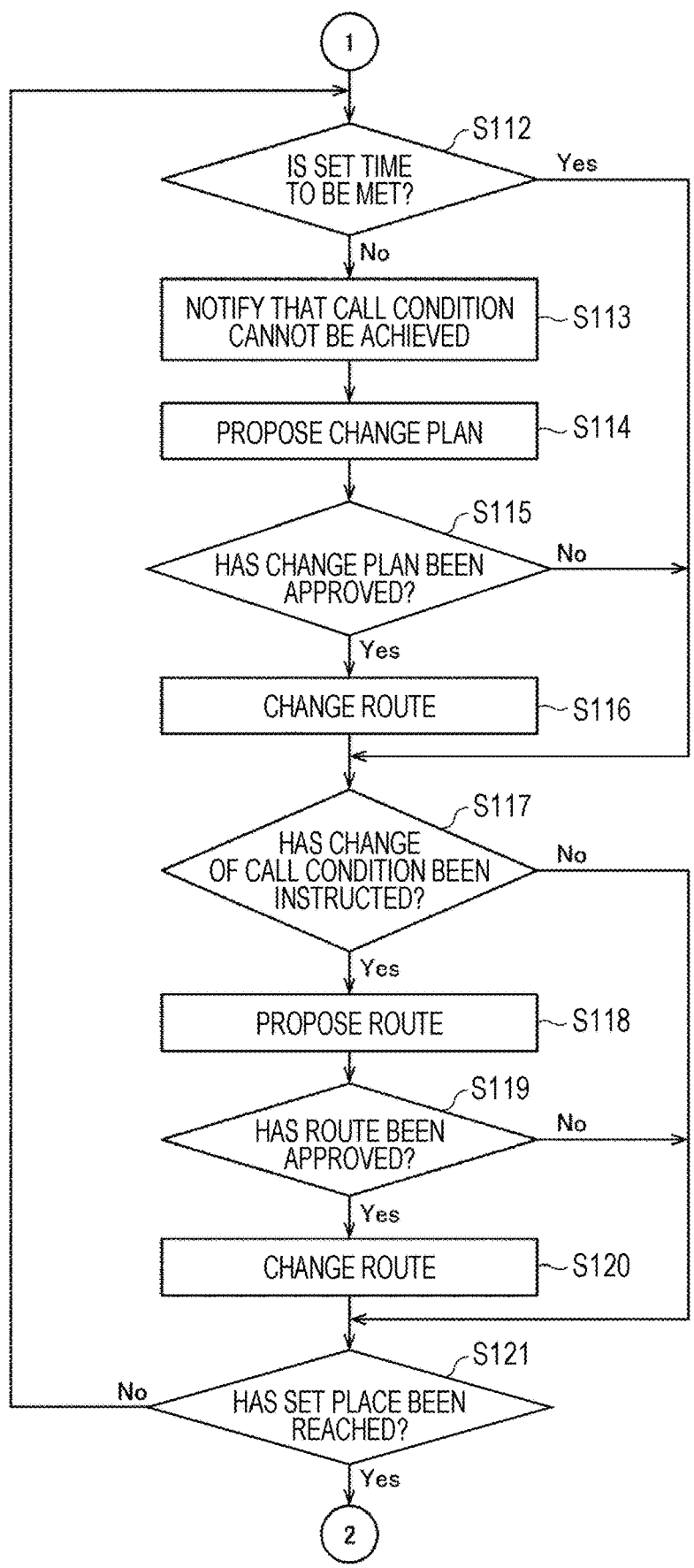
FIG. 9 is a flowchart for explaining call handling processing.
Figure 10:
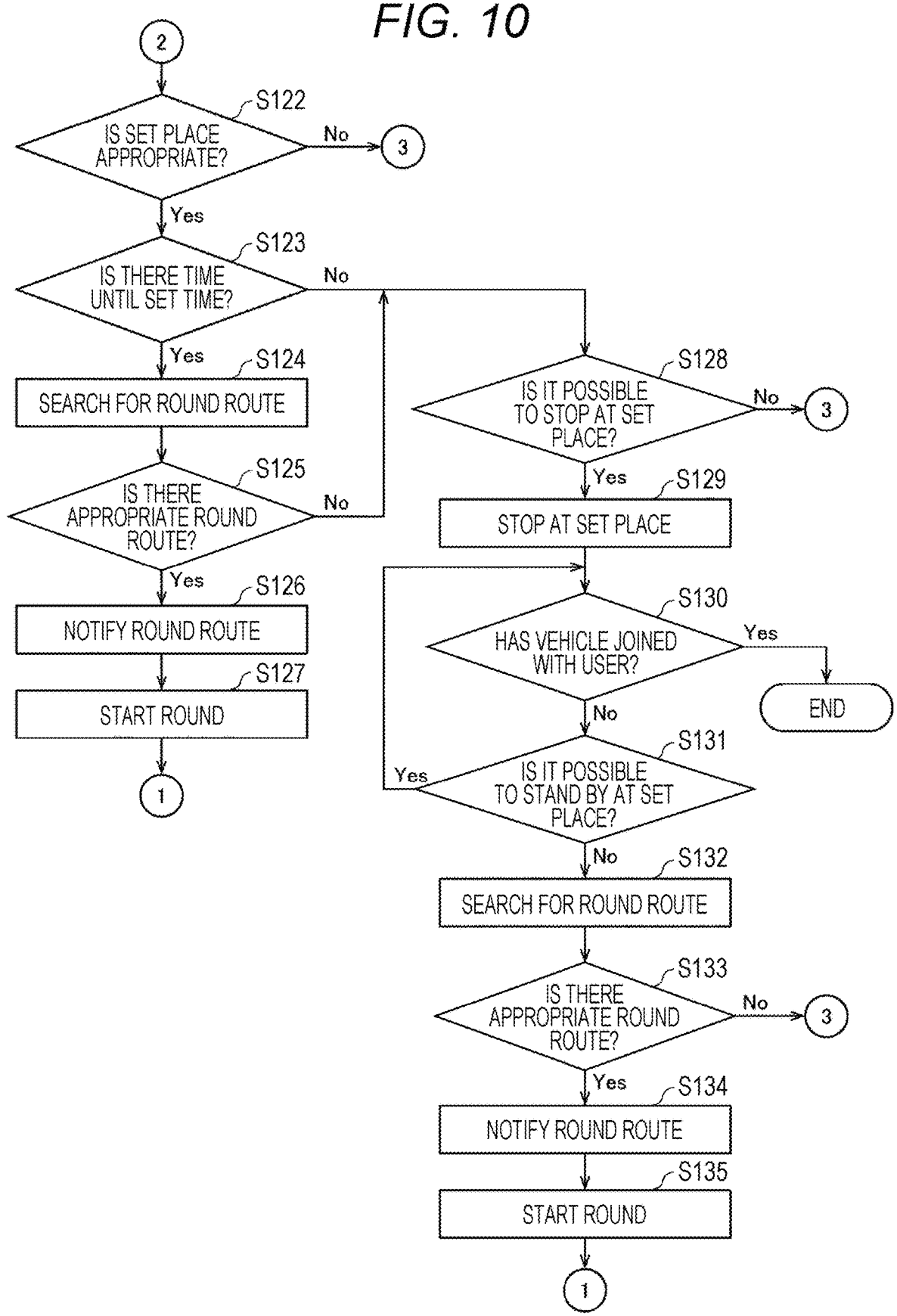
FIG. 10 is a flowchart for explaining call handling processing.

In step S303, similarly to the process of step S103 of FIG. 8, it is determined whether or not the route has been approved. In a case where it is determined that the route has not been approved, the process returns to step S302.

Thereafter, until it is determined in step S303 that the route has been approved, the processes of steps S302 and S303 are repeatedly executed, and the route is changed and proposed.

Whereas, in a case where it is determined in step S303 that the route has been approved, the process proceeds to step S304.

In step S304, similarly to the process of step S104 of FIG. 8, the route is set.

In step S305, the vehicle 11 departs for the garage 13. Specifically, the action planning unit 162 supplies data indicating a planned action to the operation planning unit 163 and the like. The operation planning unit 163 starts a process of, on the basis of data or a signal from each unit of the vehicle control system 100, planning an operation of the vehicle 11 for realizing the action planned by the action planning unit 162, and controlling the drive system control unit 107 and the like. This processing causes the vehicle 11 to start traveling toward the garage 13 in accordance with the approved route.

In step S306, similarly to the process of step S111 of FIG. 8, notification of a current location and peripheral information is started.

In step S307, the action planning unit 162 determines whether or not the garage 13 has been reached, on the basis of data or a signal from each unit of the vehicle control system 100. This determination processing is repeatedly executed until it is determined that the garage 13 has been reached. In a case where it is determined that the garage 13 has been reached, the process proceeds to step S308.

In step S308, similarly to the process of step S107 of FIG. 8, the garage 13 is opened.

In step S309, the vehicle 11 enters the garage 13. Specifically, the drive system control unit 107 controls the vehicle 11 to move into the garage 13, by controlling the drive system 108 under the control of the operation control unit 135.

In step S310, similarly to the process of step S109 of FIG. 8, the garage 13 is closed.

In step S311, the vehicle 11 notifies completion of parking-space entry. Specifically, the notification control unit 201 generates a parking-space entry completion notification signal for notifying the completion of parking-space entry of the vehicle 11 to the garage 13, and transmits to the information terminal 12 via the communication unit 103 and the network 21.

Thereafter, the parking-space entry processing ends.

As described above, the vehicle 11 can be reliably returned to the garage 13.

2. Modified Example

Hereinafter, a modified example of the above-described embodiment of the present technology will be described.

For example, the server 14 may create a change plan instead of the vehicle 11. For example, the route planning unit 161 of the vehicle 11 may instruct the server 14 to create a change plan, and the server 14 may create the change plan on the basis of information acquired from the vehicle 11 and the information terminal 12, map information, traffic jam information, construction information, and the like, and transmit to the route planning unit 161.

Furthermore, for example, the vehicle 11 may acquire map information, traffic jam information, construction information, and the like from the server 14, and use them for creating the change plan.

Moreover, for example, the setting unit 361 of the information terminal 12 may set or change the set time and the set place instead of the user. For example, the setting unit 361 may propose an appropriate set time and set place on the basis of a user's current location, a user's action schedule, a current location of the vehicle 11, map information, traffic jam information, construction information, and the like acquired from the server 14, and the user may approve.

Furthermore, for example, instead of the information terminal 12, the server 14 may set or change the set time and the set place. For example, the server 14 may propose an appropriate set time and set place on the basis of a user's current location, a user's action schedule, a current location of the vehicle 11, map information, traffic jam information, construction information, and the like, and the user may approve. Then, the setting unit 361 may set the approved set time and set place.

Moreover, for example, the user may input possibility of changing the call condition, and the vehicle control unit 362 of the information terminal 12 may transmit the possibility to the vehicle 11. Then, for example, the route planning unit 161 of the vehicle 11 may set the round route on the basis of the possibility of changing the call condition. For example, the route planning unit 161 may set the round route small to allow returning to the set place immediately, in a case where the set time is likely to be changed in the call condition.

Furthermore, for example, the server 14 may control opening and closing of the garage 13 in accordance with an instruction from the vehicle 11 or the information terminal 12.

Moreover, the present technology can be applied to, for example, a case where a plurality of users boards the vehicle 11 at different places. In this case, for example, on the basis of a desired time and place of each user, a route of the vehicle 11, a boarding order of each user, and a set place and a set time for each user are set. Furthermore, for example, in a case where the desired time or place of each user is changed, or a user is added or deleted, a change plan is created by the vehicle 11 or the server 14 and proposed to the user.

Moreover, a type of vehicle to which the present technology can be applied is not particularly limited. For example, in addition to passenger cars, trucks, and buses, the present technology can be applied to motorcycles, bicycles, personal mobility, construction machinery, agricultural machinery (tractors), and the like.

Furthermore, the present technology can be applied to mobile objects other than vehicles, such as ships and airplanes. For example, similarly to the vehicle 11 described above, the mobile object may move to a set place by a set time, stay at the set place, allow a user to board, and return to a predetermined storage location, on the basis of a user's instruction.

3. Other

<Provision Method of Software, and the Like>

The series of processes described above can be executed by hardware or also executed by software. In a case where the series of processes are executed by software, a program that configures the software is installed in the vehicle 11 or the information terminal 12.

For example, in the information terminal 12, the series of processes described above are executed, for example, by the CPU 301 loading a program recorded in the storage unit 308 into the RAM 303 via the input/output interface 305 and the bus 304, and executing.

The program executed by the information terminal 12 (the CPU 301) can be provided by being recorded on, for example, the removable medium 311 as a package medium or the like. Furthermore, the program can be provided via a wired or wireless transmission medium such as a local area network, the Internet, or digital satellite broadcasting.

In the information terminal 12, by attaching the removable medium 311 to the drive 310, the program can be installed in the storage unit 308 via the input/output interface 305. Furthermore, the program can be received by the communication unit 309 via a wired or wireless transmission medium, and installed in the storage unit 308. Besides, the program can be installed in advance in the ROM 302 and the storage unit 308.

Note that the program executed by the vehicle 11 and the information terminal 12 may be a program that executes processing in a time series, or may be a program that executes processing in parallel or at necessary timing such as when a call is made.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Moreover, the embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can have the following configurations.

(1)

A mobile-object control device including:
an operation control unit configured to control an operation of a mobile object to cause the mobile object to be present at a set place at a set time; and
a notification control unit configured to control notification in a case where at least one of the set time or the set place cannot be achieved.

(2)

The mobile-object control device according to (1) above, in which
the notification control unit controls notification in a case where the mobile object cannot stay at the set place.

(3)

The mobile-object control device according to (1) or (2) above, in which
the notification control unit controls notification in a case where the mobile object is not to be in time for the set time.

(4)

The mobile-object control device according to any one of (1) to (3) above, in which
the notification control unit further controls notification of a change plan of at least one of a route to the set place, the set time, or the set place.

(5)

The mobile-object control device according to (4) above, further including:
a planning unit configured to create the change plan on the basis of at least one of a location of the mobile object, a current location of a user who boards the mobile object, or an action schedule of the user.

(6)

The mobile-object control device according to (4) above, further including:
a planning unit configured to instruct another information processing apparatus to create the change plan, and acquire the created change plan.

(7)

The mobile-object control device according to any one of (1) to (6) above, in which
in a case where there is time until the set time, the operation control unit controls an operation of the mobile object to cause the mobile object to round around the set place.

(8)

The mobile-object control device according to (7) above, further including:
a planning unit configured to create a round route that allows returning to the set place by the set time, in which the operation control unit controls an operation of the mobile object to cause the mobile object to round in accordance with the round route.

(9)

The mobile-object control device according to any one of (1) to (8) above, in which
in a case where the mobile object cannot stay at the set place, the operation control unit controls an operation of the mobile object to cause the mobile object to round around the set place.

(10)

The mobile-object control device according to any one of (1) to (9) above, further including:
a planning unit configured to create a route that allows moving to the set place by the set time, in which the operation control unit controls an operation of the mobile object to move in accordance with the route, and
the planning unit changes the route in a case where at least one of the set time or the set place is changed.

(11)

The mobile-object control device according to any one of (1) to (10) above, in which
the notification control unit controls notification of at least one of a current location of the mobile object or peripheral information of the mobile object.

(12)

The mobile-object control device according to any one of (1) to (11) above, in which
the notification control unit controls notification to a user who boards the mobile object.

(13)

A mobile-object control method including,
by a mobile-object control device:
controlling an operation of a mobile object to cause the mobile object to be present at a set place at a set time; and
controlling notification in a case where at least one of the set time or the set place cannot be achieved.

(14)

A program for causing a computer to execute processing including:
controlling an operation of a mobile object to cause the mobile object to be present at a set place at a set time; and
controlling notification in a case where at least one of the set time or the set place cannot be achieved.

(15)

A mobile object including:
a drive unit;
an operation control unit configured to control the drive unit to cause the mobile object to be present at a set place at a set time; and
a notification control unit configured to control notification in a case where at least one of the set time or the set place cannot be achieved.

(16)

An information processing apparatus including:
a setting unit configured to set a set time and a set place; and
a mobile-object control unit configured to instruct a mobile object to be present at the set place at the set time, in which
in a case where the set time or the set place is changed by the setting unit, the mobile-object control unit instructs the mobile object to change the set time or the set place.

(17)

The information processing apparatus according to (16) above, in which
the setting unit changes the set time or the set place on the basis of information acquired from another information processing apparatus.

(18)

The information processing apparatus according to (16) or (17) above, in which
the mobile-object control unit notifies the mobile object of a rate for changing the set time or the set place.

(19)

An information processing method including, by an information processing apparatus: setting a set time and a set place;
instructing a mobile object to be present at the set place at the set time; and
instructing the mobile object to change the set time or the set place in a case where the set time or the set place is changed.

(20)

A program for causing a computer to execute processing including:
setting a set time and a set place;
instructing a mobile object to be present at the set place at the set time; and
instructing the mobile object to change the set time or the set place in a case where the set time or the set place is changed.

Note that the effects described in this specification are merely examples and are not limited, and other effects may be present.

REFERENCE SIGNS LIST

1 Information processing system
11 Vehicle
12 Information terminal
13 Garage
14 Server
100 Vehicle control system
105 Output control unit
107 Drive system control unit
108 Drive system
112 Automatic driving control unit
113 Remote control unit
131 Detection unit
132 Self-location estimation unit
133 Situation analysis unit
134 Planning unit
135 Operation control unit
141 Vehicle external information detection unit
143 Vehicle state detection unit
153 Situation recognition unit
161 Route planning unit
162 Action Planning unit
163 Operation Planning unit
201 Notification control unit
211 Garage control unit
301 CPU
351 Information processing unit
361 Setting Unit
362 Vehicle control unit
363 Notification control unit

The invention claimed is:

1. A mobile-object control device comprising:
processing circuitry configured to
transmit a call signal to a mobile object, the call signal including a set time and a set place input by a user,
receive, from the mobile object, a proposed route, selected from one or more detected routes, that allows reaching the set place by the set time,
notify the mobile object of a propriety of the proposed route,
control an operation of the mobile object to move the mobile object to be present at the set place at the set time,
receive, from the mobile object, a situation notification signal including a location of the mobile object estimated by the mobile object and an image of surroundings of the mobile object obtained by the mobile object,
determine whether at least one of the set time or the set place cannot be achieved,
in response to a determination that at least one of the set time or the set place cannot be achieved, notify the mobile object that at least one of the set time or the set place cannot be achieved, and
in a case where the mobile object arrives at the set place but subsequently cannot stay at the set place, the mobile object has not joined with the user,
and the set time can still be achieved, control an operation of the mobile object to
move the mobile object to circle around the set place.

2. The mobile-object control device according to claim 1, wherein the processing circuitry is further configured to
notify the mobile object in a case where the mobile object cannot stay at the set place.

3. The mobile-object control device according to claim 1, wherein the processing circuitry is further configured to
notify the mobile object in a case where the mobile object is not to be in time for the set time.

4. The mobile-object control device according to claim 1, wherein the processing circuitry is further configured to
notify the mobile object of a change plan of at least one of a route to the set place, the set time, or the set place.

5. The mobile-object control device according to claim 4, wherein the processing circuitry is further configured to create the change plan based on at least one of a location of the mobile object, a current location of the user who boards the mobile object, or an action schedule of the user.

6. The mobile-object control device according to claim 4, wherein the processing circuitry is further configured to instruct another information processing apparatus to create the change plan, and acquire the created change plan.

7. The mobile-object control device according to claim 1, wherein the processing circuitry is further configured to
in a case where there is time until the set time, control an operation of the mobile object to move the mobile object to circle around the set place.

8. The mobile-object control device according to claim 7, wherein the processing circuitry is further configured to create a route that allows returning to the set place by the set time, and
control an operation of the mobile object to move the mobile object to circle around in accordance with the route.

9. The mobile-object control device according to claim 1, wherein the processing circuitry is further configured to create a route that allows moving to the set place by the set time, control an operation of the mobile object to move in accordance with the route, and
change the route in a case where at least one of the set time or the set place is changed.

10. The mobile-object control device according to claim 1, wherein the processing circuitry is further configured to notify the user of at least one of a current location of the mobile object or peripheral information of the mobile object.

11. The mobile-object control device according to claim 1, wherein the processing circuitry is further configured to transmit notifications to the user who boards the mobile object.

12. The mobile-object control device according to claim 1, wherein the processing circuitry is further configured to determine that the mobile object has not joined with the user based on an information terminal of the user being farther than a predetermined distance from the mobile object.

13. A mobile-object control method comprising, by a mobile-object control device:
transmitting a call signal to a mobile object, the call signal including a set time and a set place input by a user;
receiving, from the mobile object, a proposed route, selected from one or more detected routes, that allows reaching the set place by the set time;
notifying the mobile object of a propriety of the proposed route;
controlling an operation of the mobile object to move the mobile object to be present at the set place at the set time;
receiving, from the mobile object, a situation notification signal including a location of the mobile object estimated by the mobile object and an image of surroundings of the mobile object obtained by the mobile object;
determining whether at least one of the set time or the set place cannot be achieved;
in response to a determination that at least one of the set time or the set place cannot be achieved, notifying the mobile object that at least one of the set time or the set place cannot be achieved; and
in a case where the mobile object arrives at the set place but subsequently cannot stay at the set place, the mobile object has not joined with the user, and the set time can still be achieved, controlling an operation of the mobile object to move the mobile object to circle around the set place.

14. A non-transitory computer-readable storage program storing computer-readable instructions thereon which, when executed by a computer, cause the computer to perform a method, the method comprising:
transmitting a call signal to a mobile object, the call signal including a set time and a set place input by a user;
receiving, from the mobile object, a proposed route, selected from one or more detected routes, that allows reaching the set place by the set time;
notifying the mobile object of a propriety of the proposed route;
controlling an operation of the mobile object to move the mobile object to be present at the set place at the set time;
receiving, from the mobile object, a situation notification signal including a location of the mobile object estimated by the mobile object and an image of surroundings of the mobile object obtained by the mobile object;
determining whether at least one of the set time or the set place cannot be achieved;
in response to a determination that at least one of the set time or the set place cannot be achieved, notifying the mobile object that at least one of the set time or the set place cannot be achieved; and
in a case where the mobile object arrives at the set place but subsequently cannot stay at the set place, the mobile object has not joined with the user, and the set time can still be achieved, controlling an operation of the mobile object to move the mobile object to circle around the set place.

15. A mobile object comprising:
a drive controller providing control over at least a movement direction, acceleration, and deceleration the mobile object; and
processing circuitry configured to
receive a call signal from a terminal device, the call signal including a set time and a set place input by a user,
propose a route, selected from one or more detected routes, that allows reaching the set place by the set time,
receive, from the terminal device, a propriety of the proposed route,
control an operation of the mobile object to move the mobile object to be present at the set place at the set time,
transmit, to the terminal device, a situation notification signal including a location of the mobile object estimated by the mobile object and an image of surroundings of the mobile object obtained by the mobile object,
receive a notification from the terminal device in a case where the terminal device determines that at least one of the set time or the set place cannot be achieved, and
in a case where the mobile object arrives at the set place but subsequently cannot stay at the set place, the mobile object has not joined with the user, and the set time can still be achieved, control the operation of the mobile object to move the mobile object to circle around the set place.

16. An information processing apparatus comprising:
processing circuitry configured to
set a set time and a set place; and
instruct a mobile object to be present at the set place at the set time,
receive, from the mobile object, a proposed route, selected from one or more detected routes, that allows reaching the set place by the set time,
notify the mobile object of a propriety of the proposed route,
receive, from the mobile object, a situation notification signal including a location of the mobile object estimated by the mobile object and an image of surroundings of the mobile object obtained by the mobile object,
in response to a determination that the set time or the set place is changed, instruct the mobile object to change the set time or the set place; and
in a case where the mobile object arrives at the set place but subsequently cannot stay at the set place, the mobile object has not joined with a user, and the set time can still be achieved, instruct the mobile object to circle around the set place.

17. The information processing apparatus according to claim 16, wherein the processing circuitry is further configured to change the set time or the set place on a basis of information acquired from another information processing apparatus.

18. The information processing apparatus according to claim 16, wherein the processing circuitry is further configured to notify the mobile object of possibility of changing the set time or the set place.

19. An information processing method comprising, by an information processing apparatus:

setting a set time and a set place;
instructing a mobile object to be present at the set place at the set time;
receiving, from the mobile object, a proposed route, selected from one or more detected routes, that allows reaching the set place by the set time;
notifying the mobile object of a propriety of the proposed route;
receiving, from the mobile object, a situation notification signal including a location of the mobile object estimated by the mobile object and an image of surroundings of the mobile object obtained by the mobile object;
instructing the mobile object to change the set time or the set place in response to a determination that the set time or the set place is changed; and
in a case where the mobile object arrives at the set place but subsequently cannot stay at the set place, the mobile object has not joined with a user, and the set time can still be achieved, instructing the mobile object to circle around the set place.

20. A non-transitory computer-readable storage medium storing computer-readable instructions thereon which, when executed by a computer, cause the computer to perform a method, the method comprising:

setting a set time and a set place;
instructing a mobile object to be present at the set place at the set time;
receiving, from the mobile object, a proposed route, selected from one or more detected routes, that allows reaching the set place by the set time;
notifying the mobile object of a propriety of the proposed route;
receiving, from the mobile object, a situation notification signal including a location of the mobile object estimated by the mobile object and an image of surroundings of the mobile object obtained by the mobile object;
instructing the mobile object to change the set time or the set place in response to a determination that the set time or the set place is changed; and
in a case where the mobile object arrives at the set place but subsequently cannot stay at the set place, the mobile object has not joined with a user, and the set time can still be achieved, instructing the mobile object to circle around the set place.

* * * * *